(12) United States Patent
Yamamoto

(10) Patent No.: US 8,373,874 B2
(45) Date of Patent: Feb. 12, 2013

(54) USING A WEB BROWSER ON A CLIENT TO ENABLE AND DISABLE A FILTER PROGRAM ON A PRINTER

(75) Inventor: Masahito Yamamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 809 days.

(21) Appl. No.: 10/585,645

(22) PCT Filed: Mar. 24, 2005

(86) PCT No.: PCT/JP2005/006221
§ 371 (c)(1),
(2), (4) Date: Jul. 7, 2006

(87) PCT Pub. No.: WO2005/093560
PCT Pub. Date: Oct. 6, 2005

(65) Prior Publication Data
US 2009/0180133 A1    Jul. 16, 2009

(30) Foreign Application Priority Data
Mar. 26, 2004  (JP) .................. 2004-093215

(51) Int. Cl.
*G06F 3/12* (2006.01)

(52) U.S. Cl. ..................................... 358/1.15

(58) Field of Classification Search ............. 358/1.15; 709/202, 203, 246
See application file for complete search history.

(56) References Cited

U.S. PATENT DOCUMENTS

| 6,661,526 | B1 | 12/2003 | Daly | |
|---|---|---|---|---|
| 6,683,696 | B1* | 1/2004 | Urie et al. | 358/1.15 |
| 6,968,150 | B2* | 11/2005 | Ferlitsch | 399/403 |
| 2002/0135800 | A1* | 9/2002 | Dutta | 358/1.15 |
| 2003/0011794 | A1 | 1/2003 | Yao et al. | |
| 2003/0182575 | A1* | 9/2003 | Korfanta | 713/201 |
| 2004/0001218 | A1 | 1/2004 | Christiansen | |

FOREIGN PATENT DOCUMENTS

| EP | 1100002 | 5/2001 |
|---|---|---|
| JP | 9305347 | 11/1997 |
| JP | 11-119927 | 4/1999 |
| JP | 2000-148424 | 5/2000 |

OTHER PUBLICATIONS

Supplementary European Search Report in corresponding Application No. 05727481.3, dated Aug. 27, 2009.
European Office Action dated Jun. 27, 2011 in European Application No. 05727481.3.

* cited by examiner

*Primary Examiner* — Benny Q Tieu
*Assistant Examiner* — Eric A Rust
(74) *Attorney, Agent, or Firm* — Fitzpatrick, Cella, Harper & Scinto

(57) ABSTRACT

An image processing apparatus comprises a print request data stream reception unit for externally receiving a print request data stream, a print job controller for controlling a print job of interpreting the print request data stream and executing image formation, and a filter for executing a data process to the print request data stream and thus generating the processed print request data stream. The image processing apparatus sends the print request data stream received by the print request data stream reception unit to the filter through a first interface, and sends the processed print request data stream generated by the filter to the print job controller through a second interface.

11 Claims, 12 Drawing Sheets

802
1  %!PS-Adobe-3.0
2  << /DeferredMediaSelection true /PageSize [595 842] >> setpagedevice
3  clippath 0 setgray stroke newpath
4  /Times-Roman 24 selectfont
5  50 400 moveto (ABC) show
6  showpage 803
1  %!PS-Adobe-3.0
2  << /DeferredMediaSelection false /PageSize [595 842] >> setpagedevice
3  clippath 0 setgray stroke newpath
4  /Times-Roman 24 selectfont
5  50 400 moveto (ABC) show
6  showpage

FIG. 9
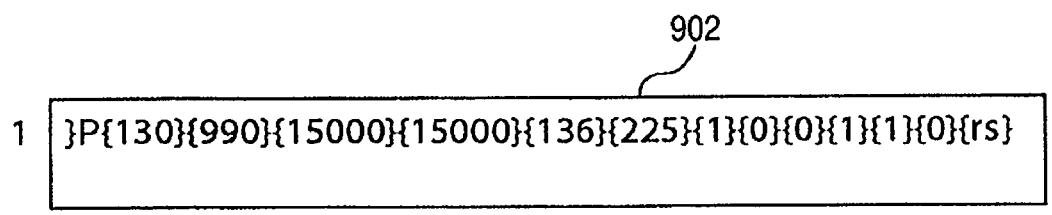
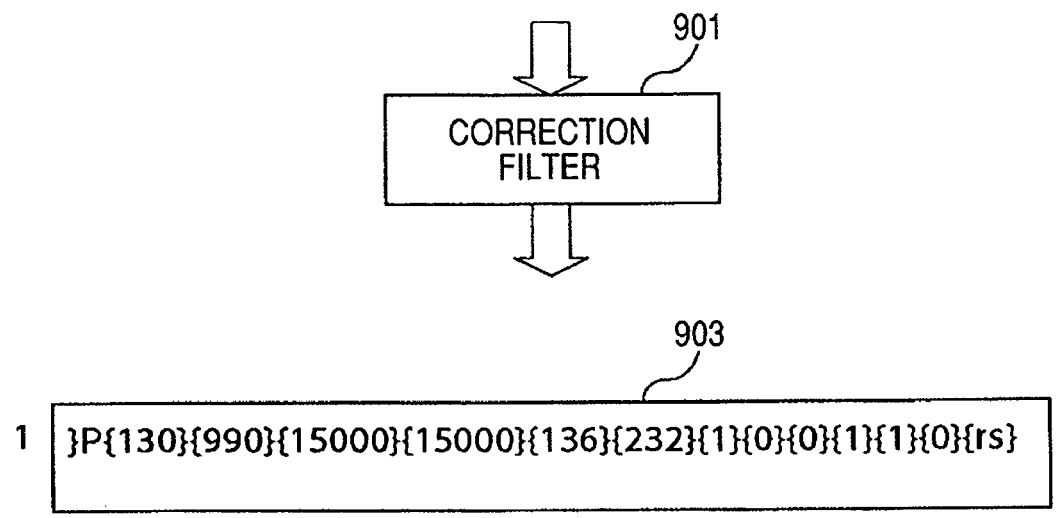

USING A WEB BROWSER ON A CLIENT TO ENABLE AND DISABLE A FILTER PROGRAM ON A PRINTER

TECHNICAL FIELD

The present invention relates to an image processing apparatus, an image processing control method, and a program. In particular, the present invention relates to an image processing apparatus which has a printer function or the like, an image processing control method which is applied to the relevant image processing apparatus, a program which is used to cause a computer to execute the relevant image processing control method, and a storage medium which stores the relevant program.

BACKGROUND ART

Conventionally, software for an image processing apparatus is mainly constituted as static and fixed so-called firmware on a real-time OS (operating system). Even when the firmware like this contains plural modules interiorly, the entire thereof is stored in a nonvolatile memory of the image processing apparatus in the state being statically linked to a single load module. Thus, at the time of boot of the OS, the firmware is loaded from the nonvolatile memory such as a hard disk or the like to a RAM (random access memory) and executed, or the firmware is directly executed on the nonvolatile memory such as a ROM (read only memory). In particular, for the purpose of economical efficiency and safety, the firmware which constitutes an embedded system in a low-priced image processing apparatus or the like is generally constituted so that the partial module is not dynamically loaded or linked. That is, the reason why the firmware is constituted as above is that the storage capacity of a symbol table necessary to achieve a dynamic link, overhead for a process for resolution to the address of a symbol, and the like deteriorate cost performance of the apparatus, and that there is a risk that a sub module additionally loaded and linked jeopardizes the quality and security of the whole system which have been sufficiently evaluated and achieved before the sub module is linked.

Consequently, as disclosed by the present applicant in, e.g., Japanese Patent Application Laid-Open No. H11-282684, Japanese Patent Application Laid-Open No. 2003-256216, or the like, an image processing apparatus in which one more layer of a software operating environment is provided on the real-time OS of firmware of an embedded system is developed. More specifically, the disclosed image processing apparatus supports the dynamic characteristics of software such as dynamic loading, dynamic linking, dynamic memory operation and the like in the software operating environment added as above. The added software operating environment is composed of an interpreter and a set of API (application programming interface) group and framework group, and provides a kind of OS or a so-called computing platform for the software running thereon. Here, the interpreter successively reads, interprets and executes a series of instruction string composed of instructions included in a predetermined instruction set. If the instruction set is considered to be equivalent to an instruction set for a CPU of hardware, the interpreter might particularly be called a virtual machine. The set of API group and framework group provides an access to the resources provided by the actual real-time OS existing in the lower layer of this software operating environment and various resource groups abstracted from hardware resources, for the benefit of the software running on the software operating environment. Here, it should be noted that the resources include an instruction execution context by a processor, various I/O's (inputs/outputs) including a memory, a file system and a network interface, and the like. Particularly, in the instruction execution context, the software operating environment can manage the instruction execution context independently of the multitask mechanism provided by the actual CPU and the real-time OS. Likewise, in the memory, the software operating environment can provide independent memory management.

The software running on the above software execution environment is successively read, interpreted and executed by the interpreter, whereby there is a possibility that the instruction string is monitored during the above process and thus the operation having an adverse affect on the system can be eliminated. Moreover, in the access from the software on the software execution environment to each resource, the resource is managed indirectly through the API group and the framework group provided by the software execution environment, whereby there is a possibility that the operation having an adverse affect on the system can be eliminated during the above process. Therefore, the approach for providing the layer of the software execution environment consisting of the interpreter, the API group and the framework group within the firmware is significantly effect to partially introduce the dynamic characteristic of software in the firmware of the low-cost embedded system to be statically and fixedly constituted fundamentally.

In the above approach, it is possible to adopt a Java™ virtual machine as the interpreter to achieve the layer of the software execution environment, whereby it is thus possible to adopt the API group and the framework group which are relevant to Java™. Incidentally, the present applicant brought MEAP™ (Multifunctional Embedded Application Platform) being the multifunctional apparatus containing a Java™ platform within the firmware of an image processing apparatus to the market in 2003.

In the meantime, for example, Japanese Patent Application Laid-Open No. H11-053132 (called JP '132) discloses a network computer built-in printer and a computer network system including the relevant printer. More specifically, in JP '132, a data file to be printed and an application corresponding to the data file are downloaded from the computer network into an application download type printer which is interiorly equipped with the network computer, and the downloaded application is started by the network computer, whereby the data file is extracted and converted into a raster image, and the acquired raster image is actually printed. Moreover, JP '132 discloses a case where the application is a Java™ applet, a case where the application is pushed from a client together with the print data file, and also a case where the printer pulls the application from an application server or the like.

Moreover, Japanese Patent Application Laid-Open No. H11-306107 (called JP '107) discloses a network communication system in which plural peripheral devices, plural terminal devices having software for operating the terminal devices, and a server device having a database concerning the software for operating at least the peripheral devices are connected to a transmission channel, and network communication is performed among these devices based on a predetermined communication protocol. More specifically, in JP '107, the peripheral device consists of a client control unit which requests/acquires latest module information corresponding to all or a part of the software for operating the peripheral device or a module used by the software to/from the server device, and a software delivery agent which delivers the acquired latest module information to the terminal devices. Moreover, JP '132 discloses that a Java™ applet and a Java™ application can be supplied as a client-side module to be used by the software for operating the peripheral devices.

Incidentally, in a PDL (page description language) printer, individual handling such as customize, minute correction or the like might be requested. That is, customer's printing environments and requests in the respective environments are various. For example, in a basic business system, it might be constituted that a business application which has been independently developed in each of the customer's environments directly generates print data. Moreover, even in the case where the business application generates the print data through a printer driver, the customer's demand or request to maintain the stability of the whole system which once began to operate normally is very strong, whereby it might not be permitted to easily change the printer driver. Besides, a certain kind of printer has the function of interpreting and printing the PDL data developed by another company. In such a case, several kinds of systems might be constituted so that the printing is executed through the printer driver developed by a third party instead of the printer driver developed to be dedicated for the relevant printer and the printer driver developed by the PDL development source, whereby it might not be permitted to change the printer driver. In other words, actual customer's environments are various, and it is thus necessary to independently handle each of these environments.

In such limitations of the actual printing environment, a printer vendor has to meet various customer's requests by handling them from the printer side without requesting the handling from the customer's environment side. For example, in a case where a finishing function of executing double-sided printing, book binding and the like is provided as the new function of a new product of printer, if a print job is entered through the dedicated printer driver developed as well as the development of the new product, or if a customer's business application is updated to generate PDL data including a newly added command string, it is of course possible to make full use of the above new function. However, it is actually requested to be able to use the new function of the printer only by handling it from the printer side without affecting any customer's system.

Alternatively, in a case where plural vendors supply the printer corresponding to a certain PDL specification, a compatibility problem that there is a difference in the interpretation of the PDL according to the capabilities of the vendors possibly occurs at all times. Therefore, in the customer's environment that the problem of this type occurs and becomes the obstacle in the actual business, the printer side has to handle and eliminate it even if it is individual handling.

Moreover, on rare occasions, the products might be shipped with a bug, being actualized with respect to PDL data of a specific pattern, contained due to the problem in printer firmware implementation (or packaging or mounting). Under normal conditions, since the printer is shipped as the product through sufficient quality evaluation, the PDL data of the above specific pattern does not come out when the relevant printer is used normally in many customer's printing environments, whereby the bug does not become a problem at all. Nevertheless, the bug might be actualized in, e.g., the above business system or the like. Thus, in such a case, it is of course necessary to take a countermeasure against the bug as promptly as possible especially in the relevant customer's environment.

Furthermore, the PDL data generated by a specific application might include a data pattern which has scope to be optimized because of a characteristic in printer implementation. For example, when the PDL data including a redundant description is compared with the PDL data including an optimum description, the improvement of print performance for the PDL data including the optimum description is remarkable as compared with that for the PDL data including the redundant description. Therefore, in the customer's printing environment to which the above specific application is used, if the application or the printer driver cannot be updated, it is desirable to optimize the PDL data by the handling of the printer side.

In order to satisfy the above requests on the printer side without affecting any customer's system, there is a method of altering the firmware constituting the printer and releasing it for individual handling, and this method might be actually adopted. However, in case of altering the firmware for the individual handling, the development period is prolonged and the development cost becomes high, including quality re-evaluation of the whole apparatus. Moreover, in case of updating the firmware embedded in the apparatus delivered to a customer's environment, since high-level maintenance by a field engineer or the like is continuously necessary, the problem remains in the point of prompt satisfaction to the customer's requests and also in the point of cost-effectiveness. In fact, a part of the customer's requests can be satisfied by adding a pre-process before the received PDL data stream is interpreted and then executing necessary conversion to the PDL data stream itself in the pre-process, even if the whole firmware of the printer is not changed. For this reason, it is necessary to provide a more dynamic mechanism by which only the software for achieving the pre-process to be executed before the received PDL data stream is interpreted can be added, in addition to another firmware, in flexible and extensible manner.

However, even if it intends to satisfy the above requests by the background art, the following problems exist.

In the conventional apparatus such as the MEAP™ which contains the software operating environment layer such as the Java™ platform within the firmware of the embedded system, it is possible to newly develop a new device embedded application in addition to the firmware on the software operating environment. Thus, the Java™ application can access the print function of the apparatus through the API. However, since the Java™ platform is located at the embedded application layer within the firmware, a print data reception function and a print server function which are achieved as the native embedded applications in the same layer cannot be diverted to the Java™ application. That is, the print server function that various print service protocols for receiving the print data through the network has to be again implemented on the Java™ application side, whereby it is inefficient in the points of development load, evaluation load, memory capacity in case of executing the print server function, and the like.

In the meantime, in another conventional apparatus which does not contain a software operating environment within the firmware of the embedded system, the whole embedded system is constituted to be able to adopt a dynamic link and a plug-in. That is, the whole system has the dynamic constitution. On the premise that the portion to which the dynamic characteristic is demanded is only the mechanism by which the pre-process to be executed before the received PDL data stream is interpreted is added in flexible and extensible manner, such approaches of the conventional apparatuses as above are not suitable for a low-cost small system due to cost increase and difficulty of quality assurance according to overhead costs for constituting the whole system as dynamic software.

DISCLOSURE OF INVENTION

The present invention has been made in consideration of such problems as above, and an object thereof is to provide an image processing apparatus which improves productivity in customization of a PDL printer, an image processing control method which is applied to the relevant image processing apparatus, and a program which is used to cause a computer to execute the relevant image processing control method.

Another object of the present invention is to provide an image processing apparatus comprising:

a print request data stream reception unit adapted to receive a print request data stream externally;

a print job controller adapted to control a print job of interpreting the print request data stream and executing image formation;

a filter unit adapted to execute a data process to the print request data stream and thus generate the processed print request data stream;

a first interface adapted to send the print request data stream received by the print request data stream reception unit to the filter unit; and a second interface adapted to send the processed print request data stream generated by the filter unit to the print job controller.

Here, for example, it is preferable that the image processing apparatus has a native environment which is a firmware constructed based on a native instruction to be processed by a processor, the native environment includes an interpreter environment which dynamically loads, links and executes a program constructed based on an instruction set defined independently of the native instruction, and the print request data stream reception unit is arranged on the native environment, and the filter unit is arranged on the interpreter environment.

Here, for example, it is preferable that the image processing apparatus further comprises a third interface unit adapted to send the print request data stream received by the print request data stream reception unit to the job controller.

Here, for example, it is preferable that the filter unit further comprises a pattern matching unit adapted to detect a portion which conforms to a predetermined data pattern in the print request data stream, and a replacement unit adapted to generate a predetermined partial data stream corresponding to the conformed portion in the print request data stream detected by the pattern matching unit, and replace the conformed portion with the generated predetermined partial data stream.

Here, for example, it is preferable that the image processing apparatus further comprises a user interface construction unit adapted to construct, in the interpreter environment, a user interface by which a user operates the program operating on the interpreter environment, and a process parameter for the data process to the print request data stream in the filter unit is operated by the user with use of the user interface constructed by the user interface construction unit.

Here, for example, it is preferable that the image processing apparatus further comprises a thread unit adapted to execute, in the interpreter environment, reading and interpretation, in parallel, of an instruction for the program operating on the interpreter environment, and the filter unit autonomously executes the data process to the print request data stream, under an independent execution context by the thread unit.

Here, for example, it is preferable that the interpreter environment is based on a Java™ platform.

Moreover, another object of the present invention is to provide an image processing apparatus comprising:

a print request data stream reception unit adapted to receive a print request data stream externally;

a print job controller adapted to control a print job of interpreting the print request data stream and executing image formation;

a filter unit adapted to execute a data process to the print request data stream and thus generate the processed print request data stream;

a first interface unit adapted to send the print request data stream received by the print request data stream reception unit to the filter unit;

a second interface unit adapted to send the processed print request data stream generated by the filter unit to the print job controller; and a filter management unit adapted to manage the plural filter units, control to be able to arrange the filter unit in a data path of the print request data stream, and cause the arranged filter unit to sequentially process the print request data stream.

Here, for example, it is preferable that the image processing apparatus further comprises a filter arrangement operation acceptance unit adapted to accept a user operation for selectively arranging the desired filter unit from among the plural filter units managed by the filter management unit in the data path of the print request data stream.

Here, for example, it is preferable that the image processing apparatus further comprises a third interface unit adapted to, in a case where the filter management unit does not arrange any filter unit in the data path of the print request data stream, directly send the print request data stream received by the print request data stream reception unit to the print job controller.

Here, for example, it is preferable that the image processing apparatus further comprises a filter introduction unit adapted to externally introduce the filter unit into the image processing apparatus so as to put the introduced filter unit under the management of the filter management unit.

Moreover, another object of the present invention is to provide a control method for an image processing apparatus which comprises a print request data stream reception unit adapted to receive a print request data stream externally, a print job controller adapted to control a print job of interpreting the print request data stream and executing image formation, and a filter unit adapted to execute a data process to the print request data stream and thus generate the processed print request data stream, the method comprising:

a first interface step of sending the print request data stream received by the print request data stream reception unit to the filter unit; and a second interface step of sending the processed print request data stream generated by the filter unit to the print job controller.

Here, for example, it is preferable that the control method further comprises a third interface step of sending the print request data stream received by the print request data stream reception unit to the job controller.

Moreover, another object of the present invention is to provide a control method for an image processing apparatus which comprises a print request data stream reception unit adapted to receive a print request data stream externally, a print job controller adapted to control a print job of interpreting the print request data stream and executing image formation, and a filter unit adapted to execute a data process to the print request data stream and thus generate the processed print request data stream, the method comprising:

a first interface step of sending the print request data stream received by the print request data stream reception unit to the filter unit;

a second interface step of sending the processed print request data stream generated by the filter unit to the print job controller; and a filter management step of managing the plural filter units, controlling to be able to arrange the filter unit in a data path of the print request data stream, and causing the arranged filter unit to sequentially process the print request data stream.

Here, for example, it is preferable that the control method further comprises a filter arrangement operation acceptance step of accepting a user operation for selectively arranging the desired filter unit from among the plural filter units managed in the filter management step in the data path of the print request data stream.

Here, for example, it is preferable that the control method further comprises a third interface step of, in a case where the filter management step is adapted to not arrange any filter unit in the data path of the print request data stream, directly sending the print request data stream received by the print request data stream reception unit to the print job controller.

Moreover, a computer program for causing a computer to execute the above control method and a computer-readable storage medium which stores the computer program to cause the computer to execute the above control method are provided.

According to the present invention, it is possible to improve productivity of the customization of the PDL printer by implementing as flexible and extensible software the filter section for executing a pre-process before the PDL data stream received by the printer is interpreted, and thus separating the implemented filter section from implementation of other sections of the printer firmware to which stability is demanded.

The above and other objects of the present invention will become apparent from the following description of exemplary embodiments with reference to the attached drawings.

BRIEF DESCRIPTION OF THE DRAWINGS

FIG. 9 is a diagram for explaining the process to be executed by the correction filter in the first embodiment;

BEST MODE FOR CARRYING OUT THE INVENTION

Hereinafter, the best mode for carrying out the present invention will be described with reference to the attached drawings.

First Embodiment

Figure 1:
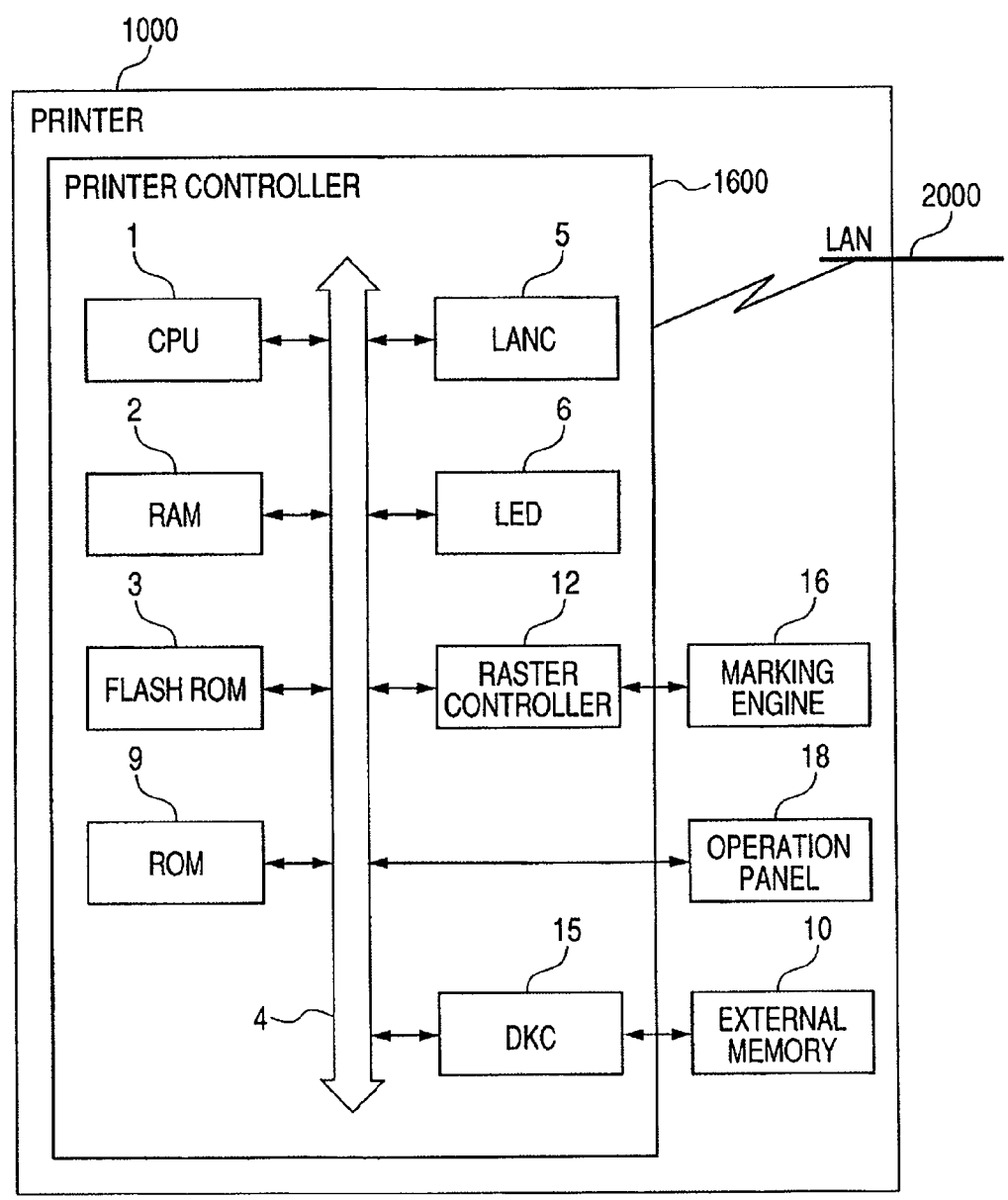
FIG. 1 is a block diagram showing the hardware constitution of an image processing apparatus according to the first embodiment of the present invention.

FIG. 1 is a block diagram showing the hardware constitution of an image processing apparatus according to the first embodiment of the present invention.

In FIG. 1, a printer 1000 includes therein a printer controller 1600.

In the printer controller 1600, a CPU (central processing unit) 1 for a network print server wholly controls print data transmitted from plural external devices and various data transmission/reception requests such as a printer control instruction and the like, based on a control program stored in a rewritable flash ROM (read only memory) 3. Here, the plural external devices are host computers and the like (not shown) connected to a LAN (local area network) 2000, and the communication on the LAN 2000 is controlled by an LANC (local area network controller) 5 connected to a system bus 4. The above various data transmission/reception requests are transmitted from the external devices according to a predetermined network communication protocol.

The CPU 1 controls whole access to the various devices connected to the system bus 4 on the basis of a control program or the like stored in a ROM 9, a control program and resource data stored in an external memory 10 connected through a DKC (disk controller) 15, and the like. Moreover, the CPU 1 causes a raster controller 12 to generate output image information and also causes a marking engine 16 to output an image signal, based on the received print data.

A RAM 2 is used as a main memory and a temporary storage area such as a working area or the like of the CPU 1.

An LED (light emitting diode) 6 functions as the display unit for displaying the operation status of the printer controller 1600. For example, the LED 6 is indicative of an electrical connection status (LINK) between the LANC 5 and the LAN 2000 and various operating statuses such as network communication modes (10Base mode or 100Base mode; full duplex mode or half duplex mode) and the like, by means of a blinking pattern or a lighting color.

An operation panel (operation unit) 18 consists of buttons, a liquid crystal panel, a touch panel superposed on the liquid crystal panel, and a display section such as LED's. Here, the buttons are used to set the operation modes or the like of the printer 1000, and execute various operations such as cancellation of print data, and the like, and the liquid crystal panel is used to display the operation status of the printer 1000.

Incidentally, the marking engine 16 is used to execute the printing by using known print technique. More specifically, the marking engine 16 executes image formation on a transfer paper through an electrophotographic method (laser beam method), an inkjet method, a dye sublimation method (thermal-transfer method), or the like.

Figure 2:
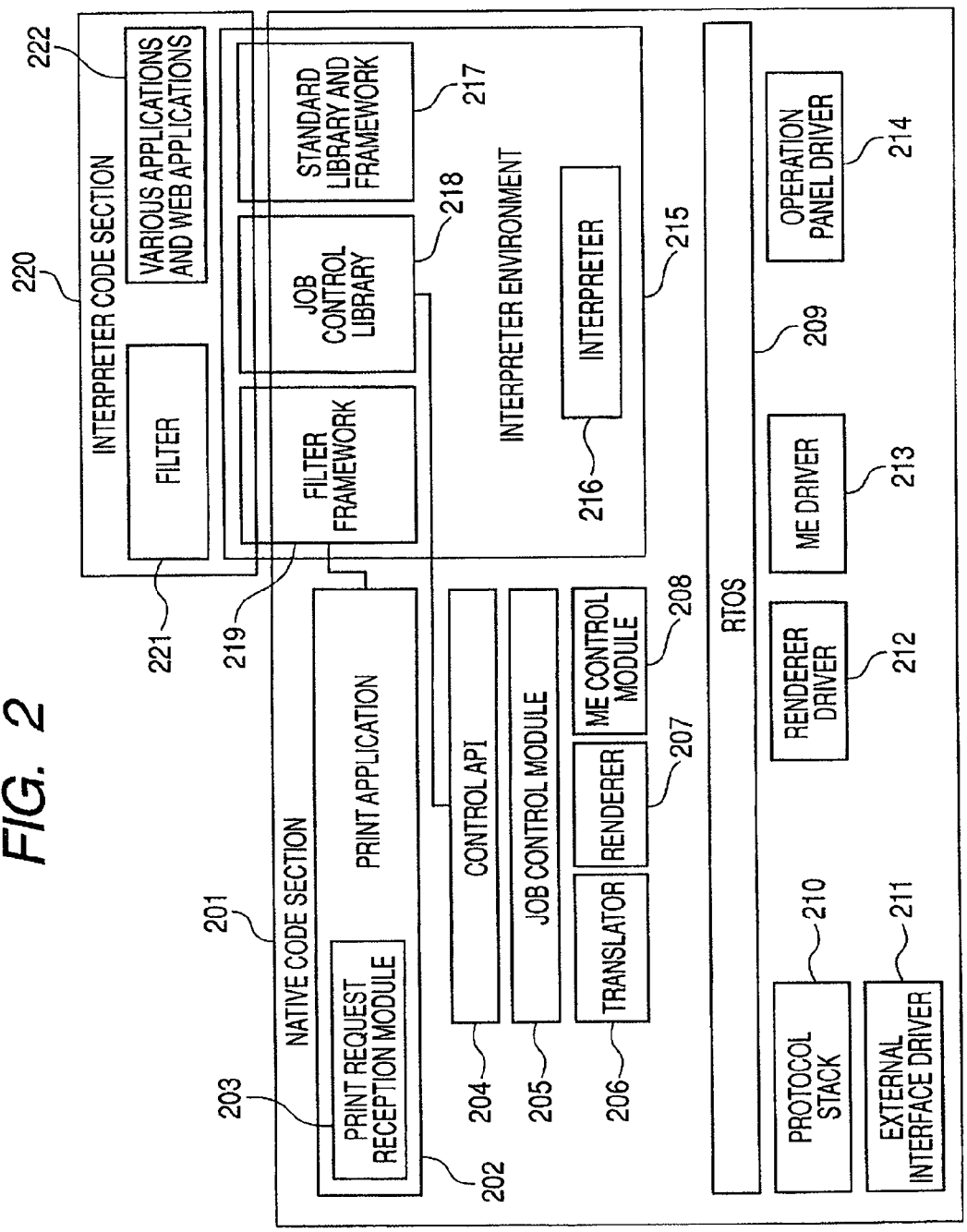
FIG. 2 is a layer diagram showing the constitution of software (module) for causing the image processing apparatus shown in FIG. 1 to operate.

FIG. 2 is a layer diagram showing the constitution of software (module) for causing the image processing apparatus shown in FIG. 1 to operate.

Here, FIG. 2 shows that the module located in the upper layer depends on the module in the lower layer, and that strong dependence exists between the modules connected by the line.

Numeral 201 denotes a native code section which is the standard section constituting the firmware of the image processing apparatus and is composed of native codes directly executed by the CPU 1 being hardware. Moreover, the native code section 201 is statically linked as the firmware to a single load module when the image processing apparatus is developed, and is stored in a nonvolatile memory of the image processing apparatus when the image processing apparatus is actually manufactured. The firmware is extracted from the nonvolatile memory into the RAM 2 when the image processing apparatus starts operation, and the CPU 1 sequentially reads and interprets the codes from the RAM 2 while the image processing apparatus is being operating. However, the CPU 1 does not execute a dynamic link. Alternatively, it is possible to store the firmware in the nonvolatile memory such as a ROM or the like capable of being read and accessed directly by the CPU and to cause the CPU to sequentially read and interpret the codes from the ROM without extracting the firmware into the RAM.

Numeral 202 denotes a print application which is the embedded application for providing the central function as the printer to the image processing apparatus. The print application 202 provides a print service in response to a request from a client, and executes a print job requested by the client through a control API (application programming interface) 204.

Numeral 203 denotes a print request reception module which receives the print job entered by the client. The print request reception module 203 depends on a protocol stack 210 through an RTOS (real-time operating system) 209. The print request from the client is transmitted to the printer physically through a network such as Ethernet™ or the like and various interfaces such as USB (Universal Serial Bus), IEEE1394 (Institute of Electrical and Electronics Engineers 1394) and the like, and application protocols for executing the print request according to the respective connection modes are defined. Moreover, the print request reception module 203 has the server function of the application protocol for the printing. The application protocol for the print service includes various specifications such as LPR (Line Printer daemon Protocol), SMB (Server Message Block), PAP (Password Authentication Protocol), NetWare and the like with respect to, for example, only a network protocol, whereby huge development costs and quality evaluation costs are necessary to achieve these specifications. Furthermore, the print request reception module 203 supports a multi protocol which consists of various print service protocols existing for each of these plural interfaces.

The print request reception module 203 may constitute a queue of the print jobs in the storage of the image processing apparatus, that is, the print request reception module 203 may have a spool function. In this case, the print request reception module 203 accepts the print job request from the client and stores it in the queue, so that the client is released. Incidentally, the print jobs stored in the queue are sequentially processed according to a scheduling algorithm when the print jobs can be actually executed.

Numeral 204 denotes the control API which is the application programming interface for accessing the device services provided by the image processing apparatus. Incidentally, one of the main interfaces constituting the control API 204 is the interface for executing and controlling the print job.

Numeral 205 denotes a job control module which controls various image processing jobs provided by the image processing apparatus. Here, the main image processing job is the print job. The job control module 205 interprets the data stream of the print job of which the execution is requested through the control API 204, and separates the description of the print job from the description of the print data to be printed. Here, the description of the print job includes environment data for designating operation parameters concerning interpretation and extraction of the print data, designation of feeding of transfer paper used for printout, designation of print modes such as double-sided printing and the like, designation of a paper discharge tray, designation of sorting (collating), designation of finishing such as stapling, bookbinding or the like, and the like. In the meantime, the print data is described by the PDL, and drawing for each page is mainly described therein. Incidentally, the job control module 205 controls a translator 206, a renderer 207 and an ME (marking engine) control module 208. Moreover, the job control module 205 executes scheduling of the print data stream so that the processes are executed in the order of the translator 206, the renderer 207 and the ME control module 208.

Numeral 206 denotes the translator which interprets the print data described by the PDL and then converts it into the print data of the description of a print intermediate language suitable for a rendering process. Here, the description of the print data by the print intermediate language suitable for the rendering process is called a display list. The translator 206 has the inherent implementation different for each of various PDL specifications, whereby any translator converts the PDL into the display list inherent for the renderer.

Numeral 207 denotes the renderer which extracts the display list into a raster image. Here, the renderer 207 depends on a render driver 212 through the RTOS 209.

Numeral 208 denotes the ME control module which controls the marking engine 16 for executing the image formation on the transfer paper in the image processing apparatus. Here, the ME control module 208 depends on an ME driver 213 through the RTOS 209.

Numeral 209 denotes the RTOS which is the platform for providing the execution environment of the native code firmware of the image processing apparatus. For the software operating thereon, the RTOS 209 provides the basic service used for the software construction and the service that the hardware resources of the image processing apparatus are abstracted, and also provides the framework of the device driver construction for abstracting the hardware of the image processing apparatus to the interface capable of being easily used from the software. Incidentally, the functions provided by the RTOS 209 include a task management that the instruction execution context by the CPU 1 is abstracted, a multitask mechanism which achieves a concurrent process by virtually operating the plural execution contexts simultaneously, cross-task communication (message queue, semaphore, etc.) which exchanges and synchronizes the messages among the tasks, various memory managements, a timer, a clock, interruption management, DMA (direct memory access) control, and the like.

Numeral 210 denotes the protocol stack which is embedded into the framework of the RTOS 209, and implements the protocol equal to or lower than a transport layer on the external interface controlled by a lower external interface driver 211. For example, in case of a network interface, the protocols such as TCP/IP (Transmission Control Protocol/Internet Protocol), UDP/IP (User Datagram Protocol/Internet Protocol) and the like are achieved, and the interface for application programming such as a Berkeley socket or the like is provided through the RTOS 209 for the embedded application layer. Moreover, for example, when the external interface is the USB, the protocol such as IEEE standard 1284.4 or the like is achieved.

Numeral 211 denotes the external interface driver which drives the hardware of providing the connection to the network interface and various interfaces such as IEEE1394, USB, RS232C (Recommended Standard 232 version C), a Centronics interface and the like. For example, in case of the network, the external interface driver 211 drives the network interface hardware for connecting to the network such as the Ethernet™ or the like, thereby achieving the physical hierarchical protocol.

Numeral 212 denotes the renderer driver which drives the renderer 207. The renderer 207 is the hardware for extracting the display list into the raster image, but may be achieved by software.

Numeral 213 denotes the ME driver which drives the marking engine 16 for executing the image formation on the transfer paper.

Numeral 214 denotes an operation panel driver which processes outputs to the display unit of the operation panel 18 of the image processing apparatus, and also processes the input events from the keys and the touch panel.

Numeral 215 denotes an interpreter environment which is the software platform based on, from among various interpreter environments, a runtime environment of the Java™ platform. In addition, an API group and a framework group which are inherent in the image processing apparatus are added to the interpreter environment 215. Here, this software platform provides the dynamic software operating environment to the program operating thereon and described by an interpreter language. Incidentally, the interpreter environment 215 includes the section (included in the native code section 201) implemented by the native code and the section (included in an interpreter code section 220) implemented as the program described by the interpreter language.

Numeral 216 denotes an interpreter which sequentially reads, interprets and executes the instructions from a instruction string described by a predetermined instruction set. In the present embodiment, the interpreter 216 is made by a Java™ virtual machine, and the instruction set is represented by Java™ byte codes.

Numeral 217 denotes a group of standard API library and framework. In the group 217, the abstracted various computing resources provided by the RTOS 209 are further abstracted by the model inherent in the interpreter environment 215, whereby the execution environment for the program operating thereon is provided. Moreover, the group 217 is achieved by the standard class library group constructing the Java™ platform, and an OSGi (Open Services Gateway initiative) framework.

The above Java™ platform provides the abstracted functions corresponding to the RTOS 209, including, for example, thread management that the instruction execution context by the virtual machine is abstracted, a multi-thread mechanism for achieving a concurrent process by virtually operating the plural execution contexts simultaneously, cross-thread communication which exchanges and synchronizes the messages among the threads, various memory managements (correction, etc.) which are highly abstracted, a timer, a clock, exception management, access to a file system and a network, interface with an external input/output device, and the like.

Moreover, the OSGi framework operates the plural Java™ applications (services) on the single Java™ virtual machine, manages lifecycles of the applications, and provides a cross-application communication function. Incidentally, plural system services have been preinstalled on the OSGi framework. Here, the prepared system services include a service management service for adding, updating and deleting a new application on the interpreter environment, an applet-viewer service for displaying on the operation panel 18 a Java™ class implemented according to an applet interface so that a user can operate the displayed class on the operation panel 18, an HTTP (HyperText Transfer Protocol) service for operating a Java™ class implemented according to a servlet interface as the web application capable of being operated from the browser of the client, and the like. In particular, the Java™ application implemented according to the applet interface can secondarily interface with the operation panel driver 214 through the API of AWT (Abstract Windowing Toolkit), or the like.

Numeral 218 denotes a job control library which depends on the control API 204. The job control library 218 provides an application programming interface of enabling the execution and the control of the image processing job, for the program operating on the interpreter environment 215.

Numeral 219 denotes a filter framework which enables interposition from the filter program implemented on the interpreter environment 215 in case of executing a print job request to the print data stream, by communicating with the print application 202.

Numeral 220 denotes the interpreter code section which is implemented as the software described by the interpreter language capable of being interpreted by the interpreter 216. Moreover, the interpreter code section 220 includes parts of the API library group and the framework group constituting the interpreter environment 215, and the program operating on the interpreter environment 215. Incidentally, with respect to the software located across the native code section 201 and the interpreter code section 220, it is necessary to execute coding of the module for interfacing between the respective spaces according to the inherent framework defined by the interpreter environment 215 and the programming model. In the present embodiment, the programming for the boundary of these spaces is executed according to JNI (Java™ Native Interface).

Numeral 221 denotes a filter which is the program implemented on the interpreter environment 215. Since the filter 221 is implemented according to the frame of the filter framework 219, it is able to execute the process for the print data stream to be processed by the print application 202. Numeral 222 denotes various applications and Web applications.

Figure 3:
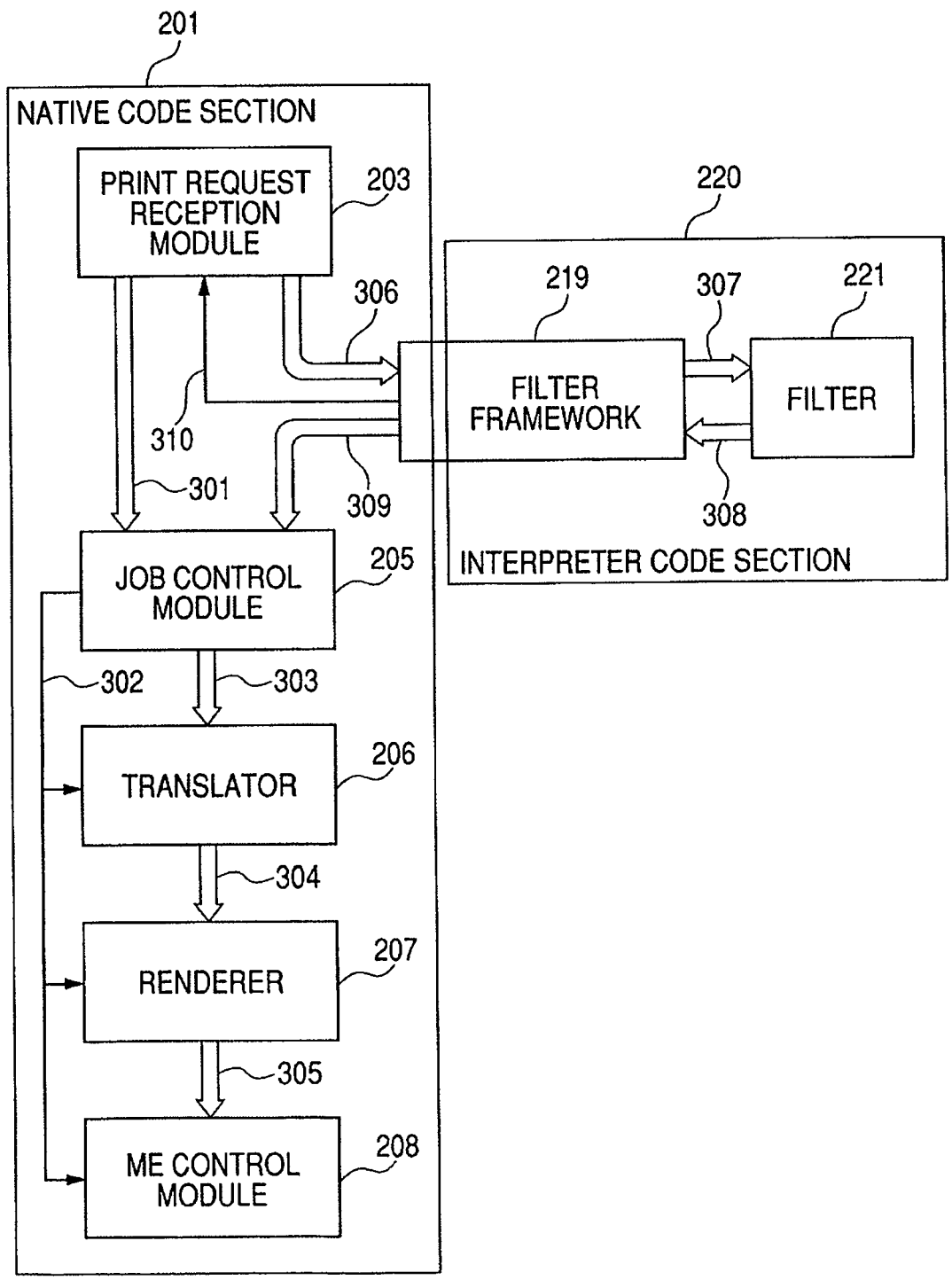
FIG. 3 is a diagram showing data flows among software modules in the image processing apparatus shown in FIG. 2.

FIG. 3 is a diagram showing data flows among software the software modules in the image processing apparatus shown in FIG. 2.

In a case where the print request reception module 203 does not execute the filter process to a print job data stream received from the client, a print job data stream 301 is flowed from the print request reception module 203 to the job control module 205. Here, for example, the print job data stream 301 is sent by the cross-task communication function such as the message queue or the like provided by the RTOS 209.

The job control module 205 sequentially interprets the print job data stream 301, and further interprets the job description in the print job data stream 301. Then, according to the interpretation, the job control module 205 controls the translator 206, the renderer 207 and the ME control module 208 through a control path 302.

In the meantime, the print data in the print job data stream 301 is a command sequence 303 which is generally described by the PDL, and the command sequence 303 is flowed to the translator 206. Then, the translator 206 interprets the print data, and generates a display list 304. The generated display list 304 is then flowed to the renderer 207. Subsequently, the renderer 207 extracts the display list 304, and generates raster image data 305. Here, the raster image data 305 might be generated in units of page, or might be generated in units of band obtained by sectioning the page into plural areas in the sub scan direction. In any case, the generated raster image data 305 is flowed to the ME control module 208. The ME control module 208 transfers the raster image data 305 to the marking engine 16, and the marking engine 16 thus executes the image formation onto the transfer paper.

The above processes are all achieved by the software implemented in the native code section 201.

In the meantime, in case of executing the filter process to the print job data stream, a print job data stream 306 received from the client by the print request reception module 203 is flowed to the filter framework 219. Here, for example, the print job data stream 306 is sent by the cross-task communication function such as the message queue or the like provided by the RTOS 209.

The runtime module of the filter framework 219 manages the filter program group implemented on the interpreter environment 215. The filter framework 215 flows the received print job data stream 306 to the filter 221 as a print job data stream 307. Here, for example, the print job data stream 307 is sent by the cross-thread communication function provided by the interpreter environment 215. Incidentally, when the plural filters are arranged or disposed, the print job data stream is flowed between the respective filters, and these print job data streams are sent by the cross-thread communication function provided by the interpreter environment 215.

The filter 221 executes a predetermined process to the received print job data stream 307, and then outputs a data stream 308. The data stream 308 output by the filter 221 is flowed to the filter framework 219. For example, the data stream 308 is sent by the cross-thread communication function provided by the interpreter environment 215.

The filter framework 219 flows the data stream 308 received from the filter 221 to the job control module 205 as a data stream 309. Here, for example, the data stream 309 is sent by the cross-task communication function such as the message queue or the like provided by the RTOS 209. After that, the data flows as well as the case of not using the filter 221.

Numeral 310 denotes a control path extending from the filter framework 219 to the print request reception module 203. The control path 310 is used to control, from the filter framework 219, the sending of the print job data stream 301 from the print request reception module 203 to the job control module 205. That is, when the filter 221 managed by the filter framework 219 is arranged in the valid status, the print job data stream 306 is valid, whereby the pre-process by the filter 221 is executed to the print job data stream 306. Meanwhile, when the filter 221 managed by the filter framework 219 is not arranged in the valid status, the print job data stream 301 is valid, whereby the print job data stream received from the client is directly flowed to the job control module 205. In this case, since it is possible to eliminate the overhead concerned by the filter framework 219, it is possible to bring out the data processing performance of the printer in the standard status that any customizing by the filter 221 is not at all applied.

Figure 4:
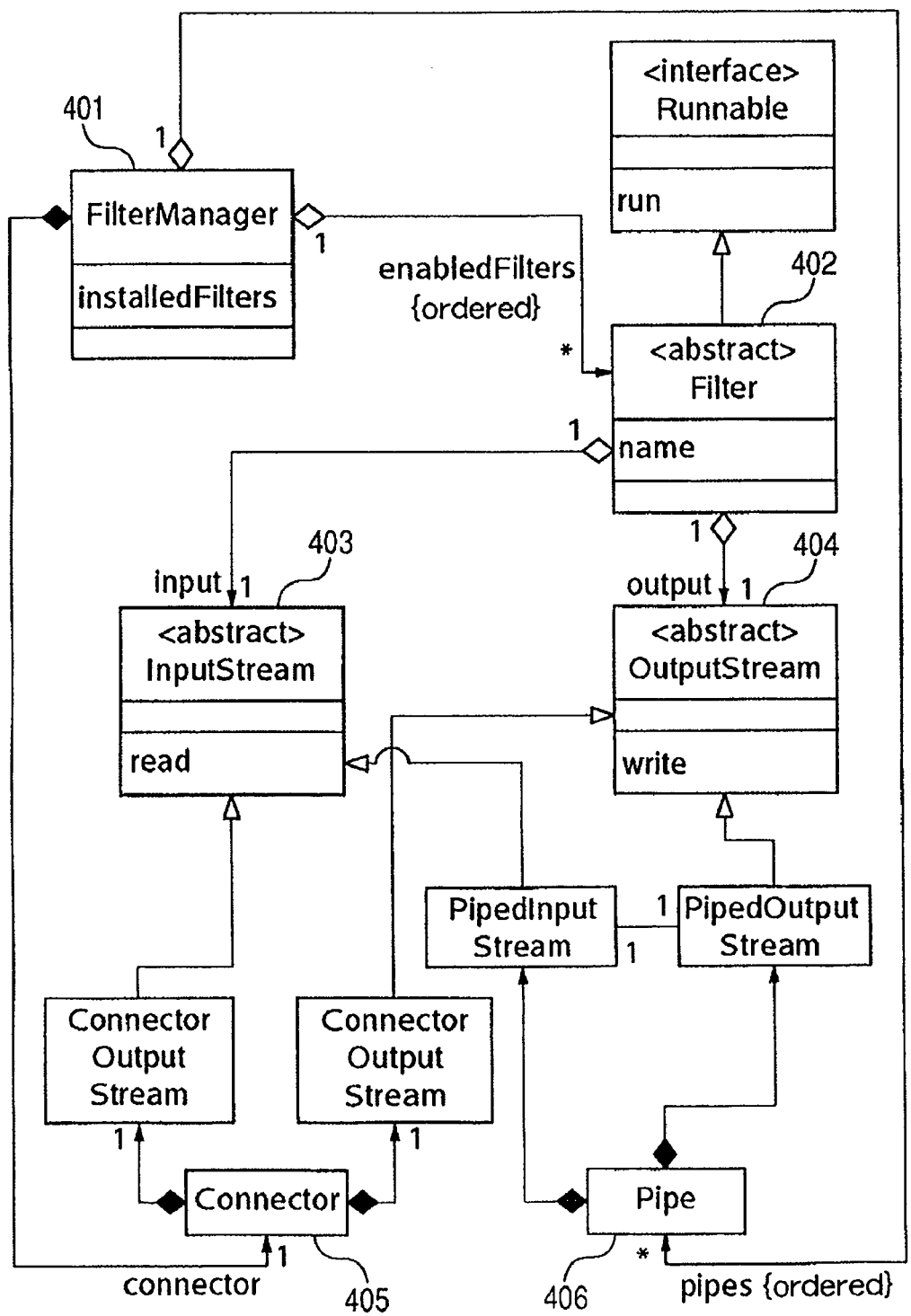
FIG. 4 is a diagram showing classes of filter framework constructed on an interpreter environment.

FIG. 4 is a diagram showing the classes of the filter framework 219 constructed on the interpreter environment 215.

In FIG. 4, a FilterManager class 401 is the class of the object for achieving the runtime environment of the filter framework 219. The FilterManager class 401 has the object of one Connector class 405 as a composition. Moreover, the FilterManager class 401 has the ordered list which consists of the reference to the object of plural (n) Filter abstract classes 402 and the reference to the object of plural (n−1) Pipe class 406. Furthermore, the FilterManager class 401 includes an installed Filter attribute for managing the concrete class of the plural Filter abstract classes 402 installed in the runtime of the filter framework 219.

The Filter abstract class 402 is the abstract class for abstracting various filter classes, and the Filter abstract class 402 has a name attribute indicating a filter name, and the like. Moreover, the Filter abstract 402 has the reference to the object of the class succeeding to an InputStream abstract class 403 as an input attribute, and the reference to the object of the class succeeding to an OutputStream abstract class 404 as an output attribute. A Runnable interface is implemented to the concrete class of the Filter abstract class 402, and the Filter abstract class 402 has a run method. When a FilterManager object generates instances of managed various filter classes and is arranged for the filter process of the data stream, the FilterManager object generates the threads corresponding to the respective arranged filter objects, and executes the run methods of the filter objects in the execution contexts of the threads of concurrently operating. That is, the filter object is sent to a parameter of a constructor, and a "java.lang.Thread" object is generated and started. Thus, the respective filter objects autonomously operate.

The InputStream abstract class 403 is the abstract class of the input source of the data stream, and has a read method capable of sequentially reading the data with respect to each calling.

The OutputStream abstract class 404 is the abstract class of the output destination of the data stream, and has a write method capable of sequentially writing the data with respect to each calling.

The Connector class 405 is the class of the object being expressive of the contact point for exchanging the data stream between the object and the native code of the interpreter environment 215. Moreover, the Connector class 405 has, as the composition, the object of a ConnectorInputStream class being the concrete class succeeding to the InputStream abstract class 403, and can sequentially read the data stream 306 flowed from the print request reception module 203 of the native code by its read method. Furthermore, the Connector class 405 has, as the composition, the object of the ConnectorOutputStream class succeeding to the OutputStream abstract class 404, and the data stream sequentially written by its write method is flowed as the data stream 309 to the job control module 205 of the native code.

The Pipe class 406 is the class of the object to be used to link the series of objects of the Filter abstract class 402 when plural filtering processes are executed to the data stream. The Pipe class 406 has, as the compositions, the object of the PipedOutputStream class succeeding to the OutputStream abstract class 404 and the object of the PipedInputStream class succeeding to the InputStream abstract class 403. Here, the PipedOutputStream object and the PipedInputStream object of the Pipe object are connected to each other, thereby achieving the cross-thread communication. That is, with respect to one Pipe object, the data stream sequentially written into the PipedOutputStream object of the relevant Pipe object by one Filter object through the write method can be sequentially read from the PipedInputStream object of the relevant Pipe object by another Filter object through the read method.

Figure 5A:
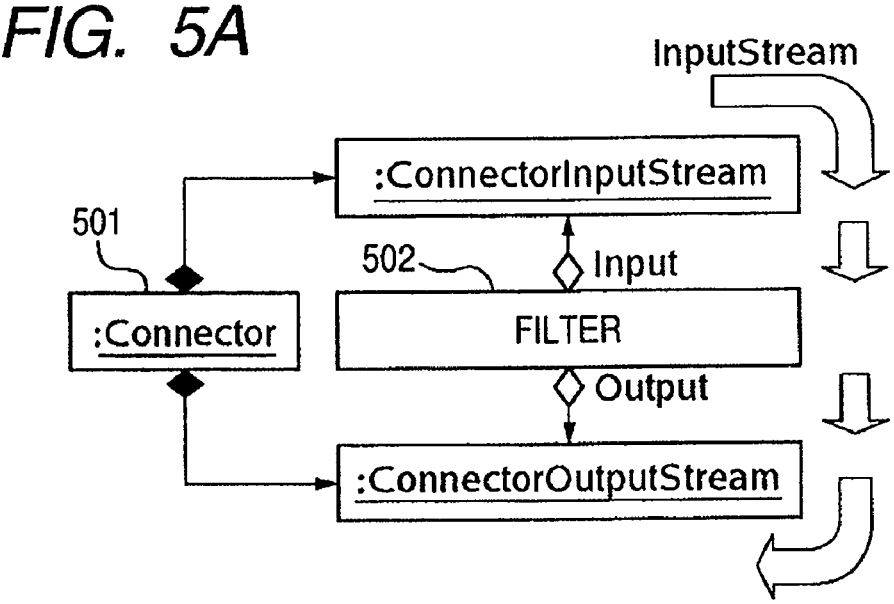
FIGS. 5A and 5B are diagrams showing instances of the object managed by the filter framework constructed on an interpreter environment.
Figure 5B:
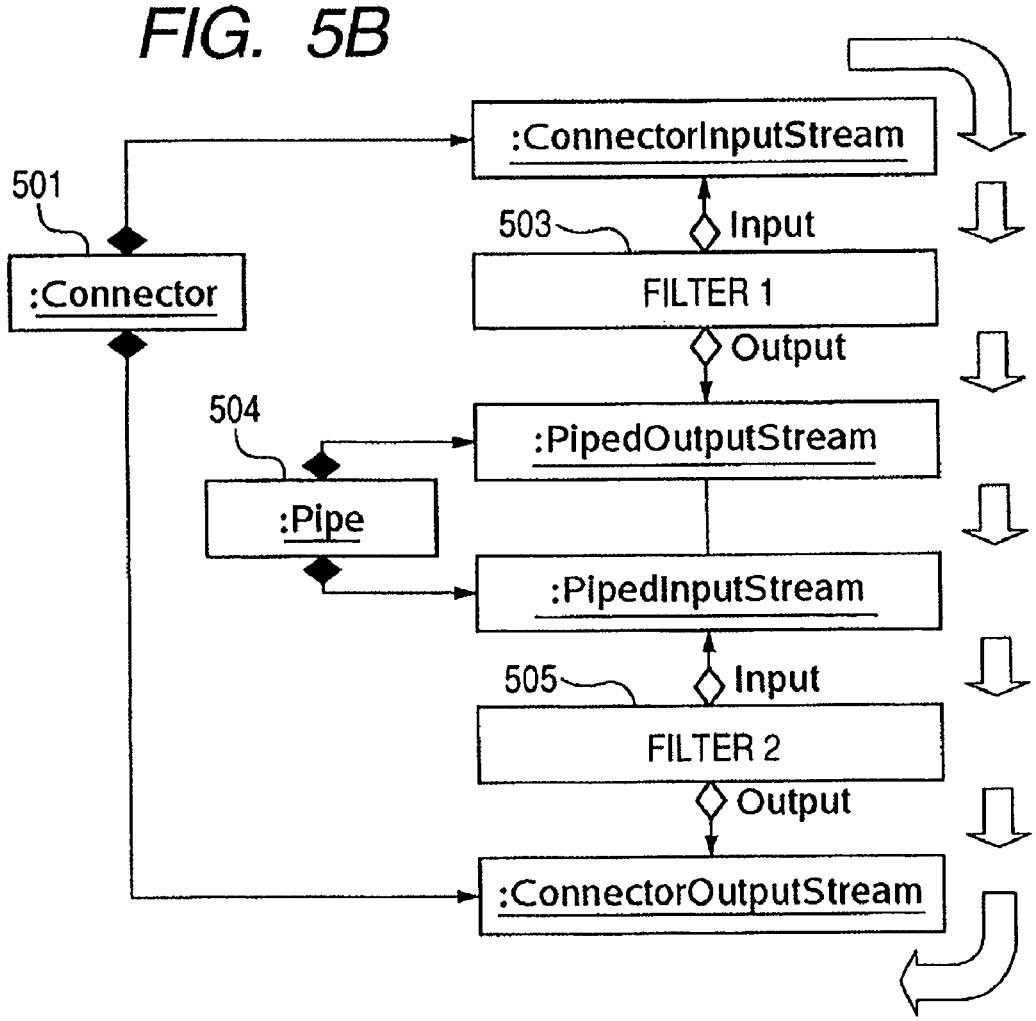

FIGS. 5A and 5B are diagrams showing the instances of the object managed by the filter framework 219 constructed on the interpreter environment 215.

More specifically, FIG. 5A shows the relation between the objects managed by the runtime of the filter framework 219 in the status that one filter is valid.

In FIG. 5A, a Connector object 501 is the object of the Connector class 405.

A filter object 502 is the object of the abstract class obtained by abstracting the Filter abstract class 402. Incidentally, the reference of the ConnectorInputStream object of the Connector object 501 is held in the input attribute of the filter object 502, and the attribute of the ConnectorOutputStream object of the Connector object 501 is held in the output attribute of the filter object 502. The filter object 502 executes the filter process to the data stream read from the ConnectorInputStream object indicated by the signal "input", and writes the filter-processed data stream in the ConnectorOutputStream object indicated by the signal "output".

In the manner as described above, the sending (the thick arrows in FIG. 5A) of the print data stream between the objects is achieved.

Moreover, FIG. 5B shows the relation among the objects managed by the runtime of the filter framework 219 in the status that the two filters are valid.

A filter 1 object 503 is the object of the abstract class obtained by abstracting the Filter abstract class 402. Incidentally, the reference of the ConnectorInputStream object of the Connector object 501 is held in the input attribute of the filter 1 object 503, and the filter 1 object 503 executes the filter process to the data stream read from the ConnectorInputStream object indicated by the signal "input". In the meantime, the reference of the PipedOutputStream object of a Pipe object 504 is held in the output attribute of the filter 1 object 503, and the filter 1 object 503 writes the filter-processed data stream in the PipedOutputStream object indicated by the signal "output".

The Pipe object 504 is the object of the Pipe class 406, and maintains the PipedOutputStream object and the PipedInputStream object in the status that these objects are being connected. Thus, the data stream sent by the calling of the write method of the PipedOutputStream object of the Pipe object 504 can be read as the data stream by the calling of the read method of the PipedInputStream object of the Pipe object 504.

A filter 2 object 505 is the object of the abstract class obtained by abstracting the Filter abstract class 402. Incidentally, the reference of the PipedInputStream of the Pipe object 504 is held in the input attribute of the filter 2 object 505, and the filter 2 object 505 executes the filter process to the data stream read from the Pipe object 504 indicated by the signal "input". In the meantime, the reference of the ConnectorOutputStream of the Connector object 501 is held in the output attribute of the filter 2 object 505, and the filter 2 object 505 writes the filter-processed data stream in the ConnectorOutputStream of the Connector object 501 indicated by the signal "output".

In the manner as described above, the sending (the thick arrows in FIG. 5B) of the print data stream among the objects is achieved. Likewise, it is possible to arrange more filter objects for the data stream process as nipping the Pipe object between the relevant filter objects.

Figure 6A:
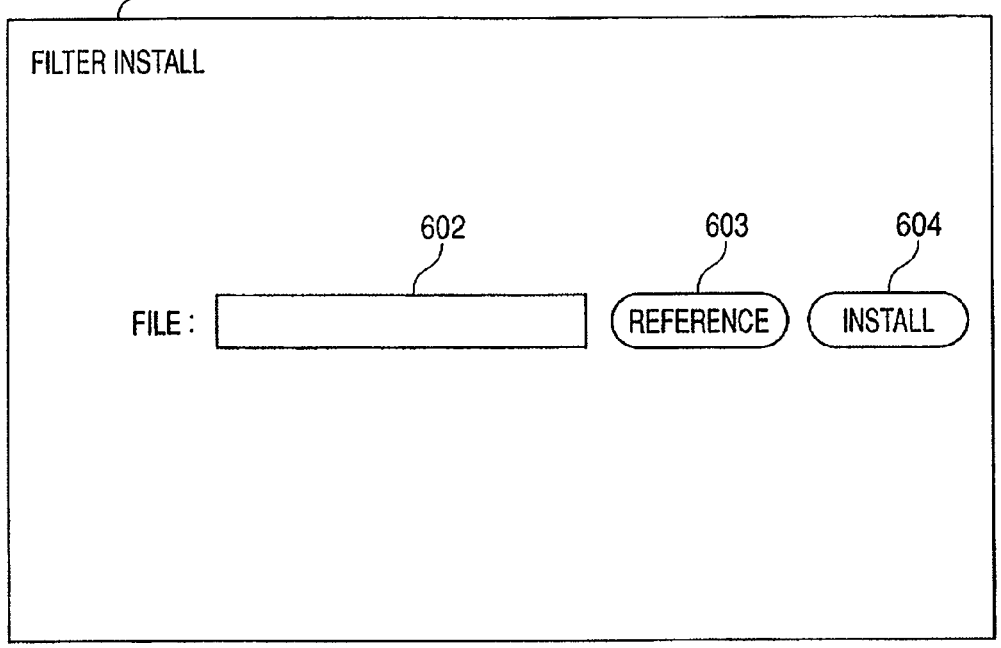
FIGS. 6A and 6B are diagrams showing examples of the user interface to be used to operate the filter framework.
Figure 6B:
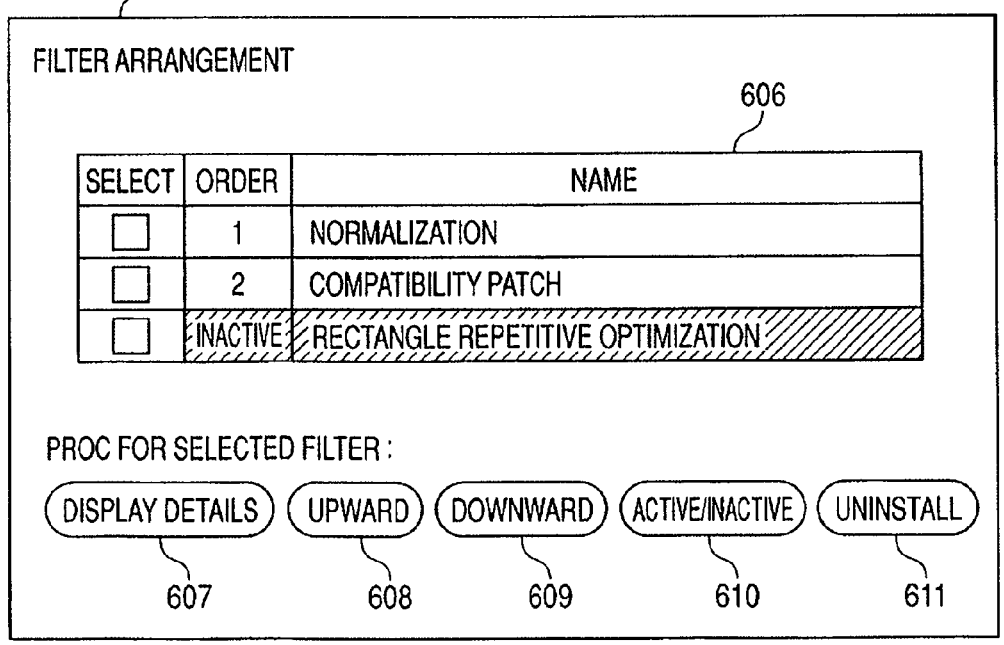

FIGS. 6A and 6B are diagrams showing examples of the user interface to be used to operate the filter framework 219.

The user interface to be used to operate the filter framework 219 is implemented as the Web application (servlet) by the standard library and the HTTP service included in the framework 217, and is operated from the Web browser on the client side. Incidentally, it is also possible to constitute the user interface so as to be implemented as the applet service and operated from the operation panel of the image processing apparatus.

FIG. 6A shows the user interface which is used to additionally install a new filter to the filter framework 219 of the image processing apparatus.

In FIG. 6A, numeral 601 denotes an example of a filter install screen.

Numeral 602 denotes a file name input field. More specifically, in the file name input field 602, the user inputs the file path of the class file of the filter class previously stored in the file system of a client computer and intended to be installed.

Numeral 603 denotes a reference button. When the reference button 603 is clicked by the user, the file selection dialog provided by the Web browser of the client computer is opened. Thus, the user can browse in the file system of the client computer and thus select the class file of the filter class intended to be installed. Then, the file path of the file selected by the user through the file selection dialog is automatically input to the file name input field 602.

Numeral 604 denotes an install button. When the install button 604 is clicked by the user, the class file of the file path input to the file name input field 602 is transmitted to the Web application for the new filter install through the Web browser of the client computer. The Web application which received the class file stores the received class file in the nonvolatile memory (the flash ROM 3 or the external memory 10) of the image processing apparatus. Moreover, the class file is dynamically loaded to the interpreter environment 215 to generate the object instance, and the generated filter object is arranged at the most downstream side of the list of the valid filter string managed by the runtime of the filter framework 219. Here, if the already valid Filter object exists in the filter string, the new Pipe object is also generated to link the new Filter object.

In a case where the above user interface has been implemented as the Web application, the mechanism of uploading the filter implementation class to the image processing apparatus executes the implementation by using the specification of file upload based on an HTML (HyperText Markup Language) form determined by RFC (Request For Comment). Consequently, in this case, the file name input field 602 and the reference button 603 are displayed by the Web browser of the client computer, and the install button 604 corresponds to "submit" of the form.

Besides, in a case where the above user interface is implemented as the applet service, the filter install screen 601 is displayed on the display section of the operation panel 18 of the image processing apparatus. Here, as the file to be designated in the file name input field 602, the file path in a removable storage medium is applicable when the image processing apparatus is equipped with a removable storage device. Otherwise, the shared file readable and accessible by the file transfer protocol such as HTTP, FTP (file transfer protocol) or the like from the image processing apparatus through the network may be designated by using URL (Uniform Resource Locator) or the like.

FIG. 6B shows the user interface which is used to arrange the filter installed in the filter framework 219 of the image processing apparatus.

In FIG. 6B, numeral 605 denotes an example of a filter arrangement screen.

Numeral 606 denotes a table for listing the filter group installed in the runtime of the filter framework 219. In the table 606, each row corresponds to each of the installed filters, the "selection" column includes check boxes, whereby the filter corresponding to the checked row is selected as the target of the later-described operation. Moreover, in the "order" column of the table 606, the message "inactive" is displayed when the filter is in the inactivated status. Meanwhile, when the filters are in the activated status, the numbers (that is, the order of the data stream process) are displayed in ascending order from the upstream to the downstream. Besides, in the "name" column of the table 606, the names of the respective filters described to the name attribute of the filter object are displayed.

Numerals 607 to 611 denote respective buttons which are used to indicate the operation for the selected filter. More specifically, these buttons are used to indicate the operation for the filter described in the row of which the check box in the "selection" column of the table 606 is checked.

That is, when the "details display" button 607 is clicked by the user, the detailed information concerning the selected filter is displayed. Here, the detailed information includes the name and the version of the selected filter, the explanation thereof, the class name, the class file name of the install source (file path or URL), the installed date and time, and the like.

When the "upward" button 608 is clicked by the user, the order of the selected filter in the filter string is changed by one step toward the upstream direction in the data stream process.

When the "downward" button 609 is clicked by the user, the order of the selected filter in the filter string is changed by one step toward the downstream direction in the data stream process.

When the "active/inactive" toggle button 610 is clicked by the user, the activated status of the selected filter is changed to the inactivated status, and, otherwise, the inactivated status of the selected filter is changed to the activated status. The inactivated filter object is deleted. However, the filter class remains while installed, and the remained filter class is managed by the runtime of the filter framework 219.

Further, when the "uninstall" button 611 is clicked by the user, the class file of the selected filter is deleted from the interpreter environment 215 of the image processing apparatus.

Figure 7:
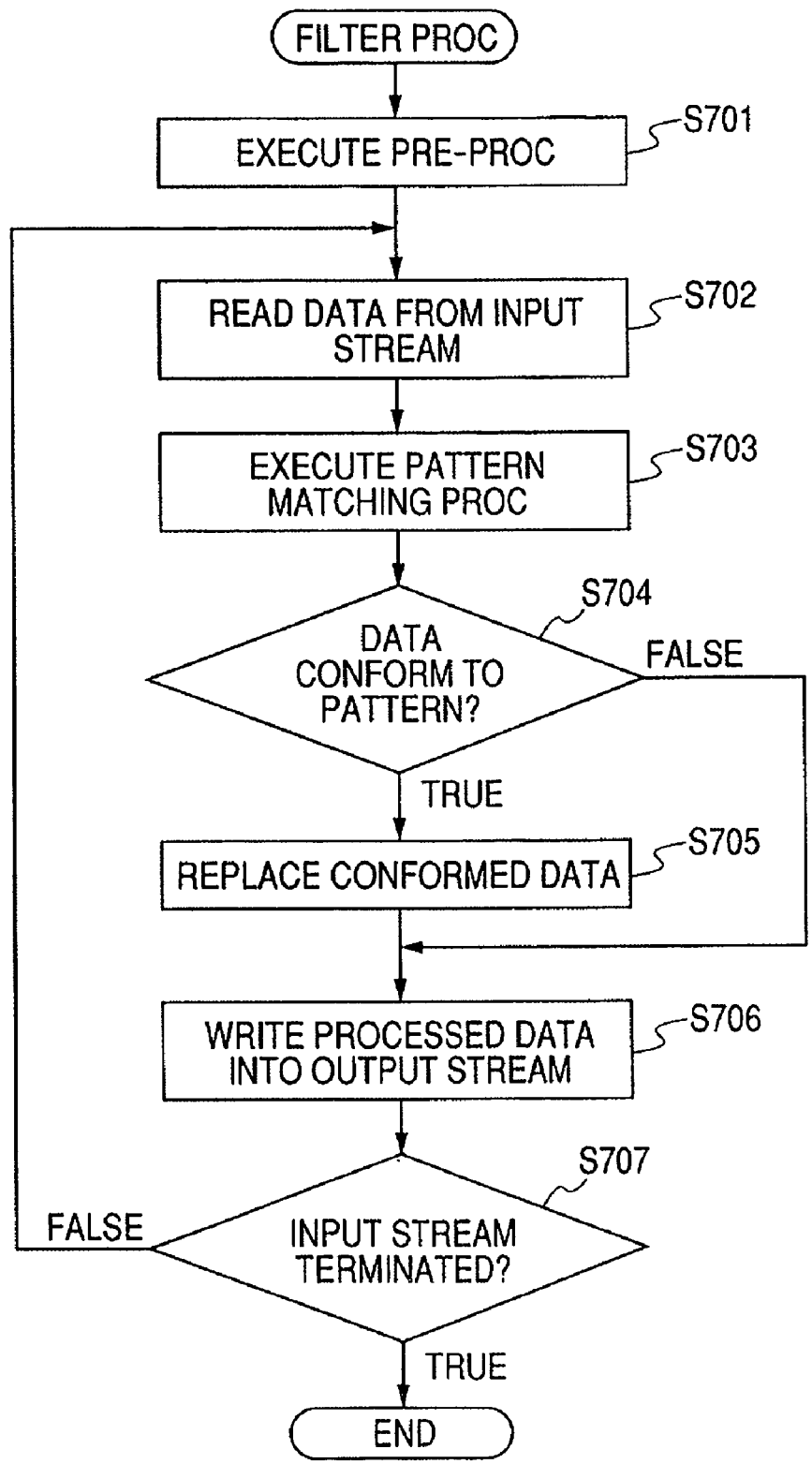
FIG. 7 is a flow chart showing the main procedure of a filter process.

FIG. 7 is a flow chart showing the main procedure of the filter process.

Here, it should be noted that the procedure shown in FIG. 7 is implemented as the run method of the concrete filter class. That is, the filter framework 219 generates the object of the valid filter class, sets up the input stream and the output stream thereof, and then allocates the thread (Thread object) for executing the run method of this object. Thus, the procedure shown in FIG. 7 autonomously operates, as parallel processes, in the respective filter objects managed by the filter framework 219.

First, in a step S701, necessary pre-processes are executed. Here, it should be noted that the pre-processes include initialization of the attributed to be interiorly used by the filter, a pre-process to a pattern description to be used in pattern matching, a process of wrapping the stream by a qualified class (concrete class of java.io.FilterInputStream or java.io.FilterOutputStream) for adding the function enabling to more easily use the input stream and the output stream (for example, enabling to look-ahead the input stream, expanding buffering for effectively using system resources), and the like.

In a step S702, the data of a necessary amount for the pattern matching process is read from the input stream set in the input attribute.

In a step S703, the pattern matching is executed to find appearance of the data pattern to be operated by the filter from the input data stream. Here, it should be noted that the data pattern that the filter should operate may be the fixed data string itself, or may be described by a formal language such as regular expression or the like. Moreover, it should be noted that various implementations for finding, in the data stream, appearance of the data which conforms to the pattern description are widely known (particularly, "grep", "sed", "AWK", "Perl", etc. are famous).

The algorithm for effectively executing the pattern matching is studied sufficiently. That is, with respect to the fixed pattern description, a method of comparing respective hash functions of the pattern description and the partial data stream with each other and judging that the relevant patterns completely conform to each other when the hash values of the compared hash functions conform to each other is known. In addition, a method of Knuth-Morris-Pratt, a method of Boyer-Moore, and the like are known. Besides, with respect to the pattern description by the regular expression or the like, various algorithms in the background of a form language theory such as a finite automaton or the like are known. In the comparatively recent Java™ platform, the class library for dealing with the regular expression is provided normally (java.util.regex). For example, when the status changes according to the pattern of the upstream of the data stream and the interpretation of the pattern of the downstream has to be changed according to the changed status, the complicated pattern matching rather difficult to be described in the regular expression or the like is necessary. In such a case, the algorithm for evaluating the characteristic itself of the relevant pattern may be written as a Java™ program. By doing so, even how complicated pattern matching, it can be implemented obediently.

In a step S704, it is judged whether or not the data which conforms to the pattern description is found in the data stream. When judged that the relevant data is found in the data stream, the flow advances to a step S705. Meanwhile, when judged that the relevant data is not found in the data stream, the flow advances to a step S706.

Then, in the step S705, an operation according to the object of the relevant filter is executed with respect to the partial data string in the data stream which conforms to the pattern description, and the acquired (conformed) data is replaced.

Subsequently, in the step S706, the processed partial data string is written into the output stream. More specifically, the data string in which the monitored pattern does not appear or the data string which includes the monitored pattern and has been processed in the step S705 is written into the output stream.

Then, it is judged in a step S707 whether or not the input stream is terminated. When judged that the input stream is terminated, the process ends. Meanwhile, when judged that the input stream is not terminated, the flow returns to the step S702 to repeat the above procedure.

Figure 8:
FIG. 8 is a diagram for explaining the process to be executed by the compatible filter in the first embodiment.

FIG. 8 is a diagram for explaining the process to be executed by a compatible filter in the present embodiment.

In FIG. 8, numeral 801 denotes a compatible filter class object (compatible filter) which reads the input stream, executes the process to solve the problem of compatibility appearing in the data stream, and then writes the processed data stream into the output stream. Here, as the problem of compatibility, a problem which is based on the difference in interpretation with respect to each vendor among the printers of the vendors to which a Postscript specification of Adobe being one of the typical PDL is implemented is took up, and an example of the solution thereof will be explained.

According to the printer of a certain vendor, in "setpagedevice" of PostScript, when "/DeferredMediaSelection" is true, a paper request for custom paper is displayed on the panel. Meanwhile, when "/DeferredMediaSelection" is false, a definite paper is searched within the range of ±5 from the designated paper size. If there is no definite paper, the implementation is executed so as to obey Policy of PostScript. Moreover, according to the printer of another vendor, when "/DeferredMediaSelection" is true, a definite paper is searched with the designated size itself (no range). If there is no definite paper, a paper is treated as custom paper. Meanwhile, when "/DeferredMediaSelection" is false, a definite paper is searched within the range of ±5 from the designated paper size. If there is no definite paper, the implementation is executed so as to obey Policy of PostScript.

Here, it is assumed that an infrastructure environment for a basic system supplied by further another vendor is constructed on the assumption of the behavior based on the latter of the above interpretations. In such a case, in the former printer with respect to the print request of this system, a paper is treated as custom paper in a situation which is contrary to user's expectation, whereby "no paper" is displayed on the operation panel. Thus, a customer's disadvantage that printing is impossible occurs. For this reason, the vendor of the former printer is demanded to provide the solution for such a compatibility problem to the customers as quickly and low cost as possible. It is possible to cope with such a demand at least provisionally by converting the parameter "/DeferredMediaSelection" of "setpagedevice" appearing in the print request data stream from "true" to "false".

The compatible filter 801 is the filter object which contributes to solve this problem. More specifically, the compatible filter 801 executes the pattern matching to "setpagedevice" designated through "true" of "/DeferredMediaSelection" from the input data stream. When the matching (or conformation) is acquired, "true" of "/DeferredMediaSelection" is replaced by "false" thereof, and the output data stream is output.

Numeral 802 denotes an example of the input data stream, that is, the print data of PostScript. On the second line of the input data stream 802, the partial data which conforms to the pattern appears.

Numeral 803 denotes an example of the output data stream, that is, the filter-processed print data of PostScript. In the data on the second line of the output data stream 803, the character string "true" has been replaced with the character string "false".

FIG. 9 is a diagram for explaining the process to be executed by the correction filter in the present embodiment.

The above compatible filter uses the pattern matching and replacement technique to solve the compatibility problem based on the difference in specification interpretations between the printers. Here, it should be noted that the same technique can be used also to urgently eliminate the inconvenience in printer implementation (e.g., a bug of the firmware). For example, it is assumed that, in a case where a certain version of a certain printer is released, there is a bug that drawing irregularity occurs if the width of the image designated in "image area securement instruction (VDM)" of a LIPS (LBP Image Printing System) language is not a multiple of eight. Here, even if the data stream of such a pattern is output on rare occasions only in specific use of a specific application, or even if the above bug has to be essentially corrected in the core portion of the LIPS language processing system such as translator or renderer, it is necessary to cope with such inconvenience as quickly as possible in an actual customer's environment. Such a problem is solved by the correction filter.

In FIG. 9, numeral 901 denotes a correction filter which finds a pattern of causing the bug from the LIPS data stream including, e.g., data as denoted by 902 (that is, the image width of VDM is "225" being not a multiple of eight), and replaces the data 902 with data as denoted by 903 of achieving the equivalent function without causing the bug (that is, the image width of VDM is replaced with "232" being a multiple of eight and larger than "225").

As above, according to the first embodiment, the interface for sending the data stream received by the print request reception server statically implemented as the firmware to the filter software implemented on the embedded Java™ environment and capable of being dynamically loaded and dynamically linked is provided, whereby it is possible to apparently divide the stable portion and the dynamic portion from each other. For this reason, it is possible to eliminate the inefficiency that the whole device firmware is replaced with the dynamic and redundant software. Moreover, it is possible to eliminate the inefficiency that the print request reception server function is re-implemented and thus doubled on the side of the Java™ environment. Therefore, it is possible to achieve the filter framework which is rational in device costs and development loads. Moreover, it is possible to easily achieve the dynamic addition and replacement of the filter with respect to the image processing apparatus already delivered and supplied in the customer's environment, whereby it is possible to provide the solution as quickly as possible to the customer with low support costs.

Moreover, according to the first embodiment, the filter is implemented on the Java™ environment which is sophisticated as compared with the firmware development environment of the embedded system, whereby it is possible to easily implement a high-level pattern matching algorithm in which the dynamic memory management usually difficult in the embedded system brings about an effect. Moreover, it is possible to easily adopt the design pattern which is based on an object-oriented paradigm because the system is designed as the software which is highly modularized and of which the reusability is high. Thus, the filter or the filter section can be implemented with high productivity.

Furthermore, in the filter, the PDL data for causing the compatibility problem with respect to another implementation is found in the input data stream through the pattern matching, and the found data is replaced. Thus, it is possible to solve the compatibility problem as quickly and low cost as possible. In particular, such an effect can be achieved only by the measure which is closed to the printer side without affecting the system, the application and the printer driver on the customer's environment.

Moreover, when the filter is not arranged, it is constituted that the data stream received by the print request reception module is directly flowed to the job control module. Thus, in the case where the filter is unnecessary, it is possible to eliminate the overhead relevant to the filter framework, whereby it is possible to maintain the data processing performance which is inherent in the printer.

Second Embodiment

Subsequently, the second embodiment of the present invention will be explained.

Here, it should be noted that the constitution of the second embodiment is basically the same as that of the first embodiment. Therefore, in the constitution of the second embodiment, the parts same as those in the constitution of the first embodiment are denoted by the respective same reference numerals, and the explanation of the same parts will be omitted. That is, in the second embodiment, only the parts different from the first embodiment will be explained.

Figure 10:
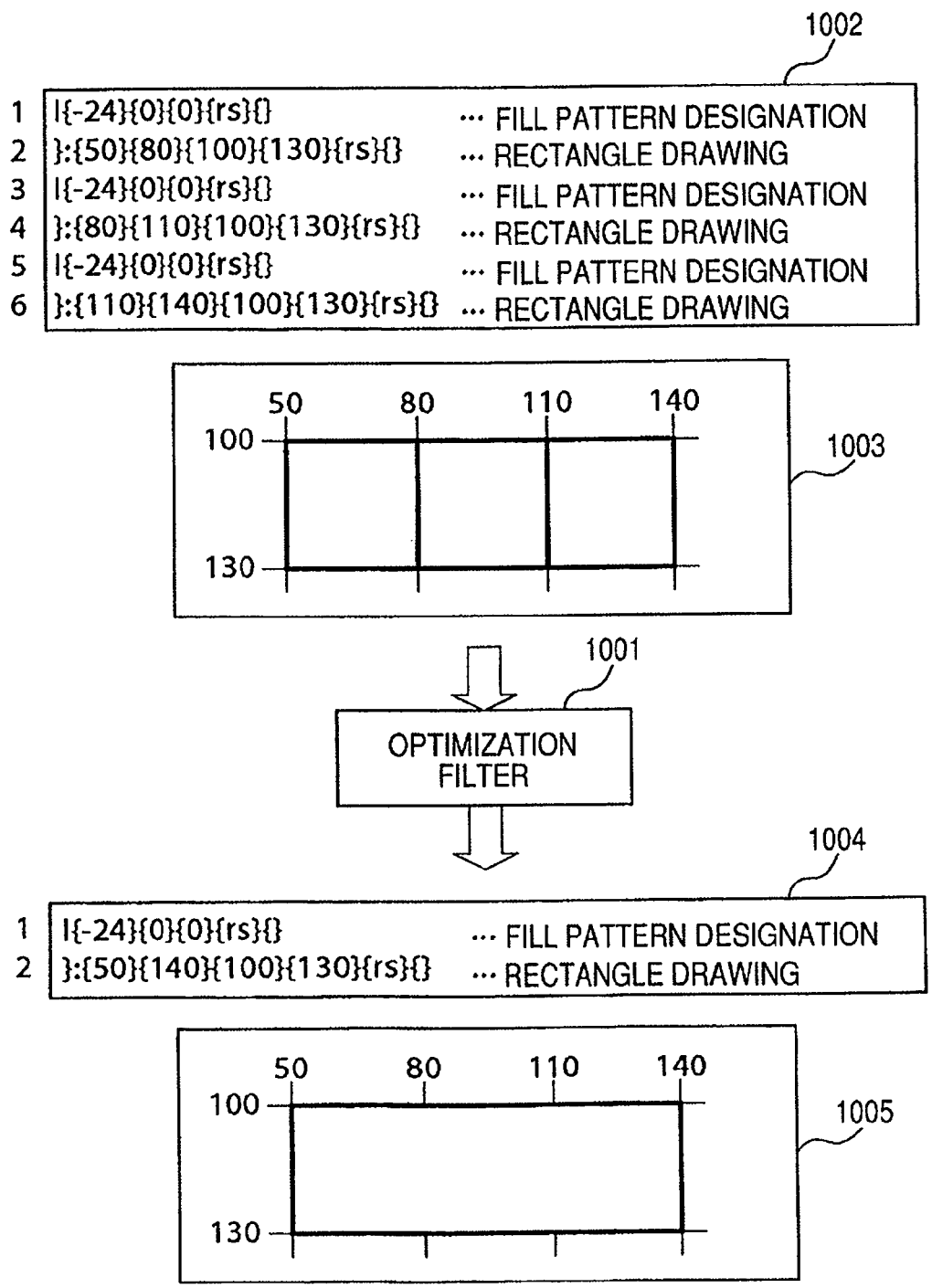
FIG. 10 is a diagram for explaining the process to be executed by the filter in the second embodiment.

FIG. 10 is a diagram for explaining the process to be executed by the filter in the second embodiment.

In FIG. 10, numeral 1001 denotes an optimization filter class object which reads the input stream, finds redundantly described PDL data appearing in the data stream, converts the found data into the more efficient equivalent-function data, and writes the converted data into the output stream. The PDL data stream generated by the printer driver essentially tends to include a redundant processing pattern such as repetition or the like according to a client's print request system and a reason on the application side. The optimization filter class object 1001 recognizes the above redundant pattern as "conventional expression" of a kind, and replaces this pattern with a more efficient equivalent expression.

Numeral 1002 denotes an example of the input data stream to the optimization filter class object 1001. In the input data stream 1002, as shown in a block 1003, the description to repeat filling (or painting) of three squares so as to fill (or paint) a landscape rectangle is carried out.

Numeral 1004 denotes an example of the output data stream from the optimization filter class object 1001. The optimization filter class object 1001 detects the redundant repetitive pattern, and rewrites the detected pattern to one equivalent landscape rectangle filling as shown in a block 1005.

As above, according to the second embodiment, in the filter which is flexibly extensible on the Java™ environment, the redundant description pattern is recognized as the "conventional expression" of a kind, and this pattern is replaced with the more efficient equivalent expression. Thus, it is possible to improve the print performance without touching the core of the PDL processing system at all. Moreover, according to the second embodiment, the optimization process is executed in the status which is closed to the printer side, it is unnecessary to alter or convert the system, the application and the printer driver on the customer's environment. Furthermore, the filter productivity is high, and the filter maintenance such as implementation is easy. Thus, there is a possibility that optimization individually corresponding to the customer can be provided according to the type of customer's use.

Third Embodiment

Subsequently, the third embodiment of the present invention will be explained.

Here, it should be noted that the constitution of the third embodiment is basically the same as that of the first embodiment. Therefore, in the constitution of the third embodiment, the parts same as those in the constitution of the first embodiment are denoted by the respective same reference numerals, and the explanation of the same parts will be omitted. That is, in the third embodiment, only the parts different from the first embodiment will be explained.

Figure 11:
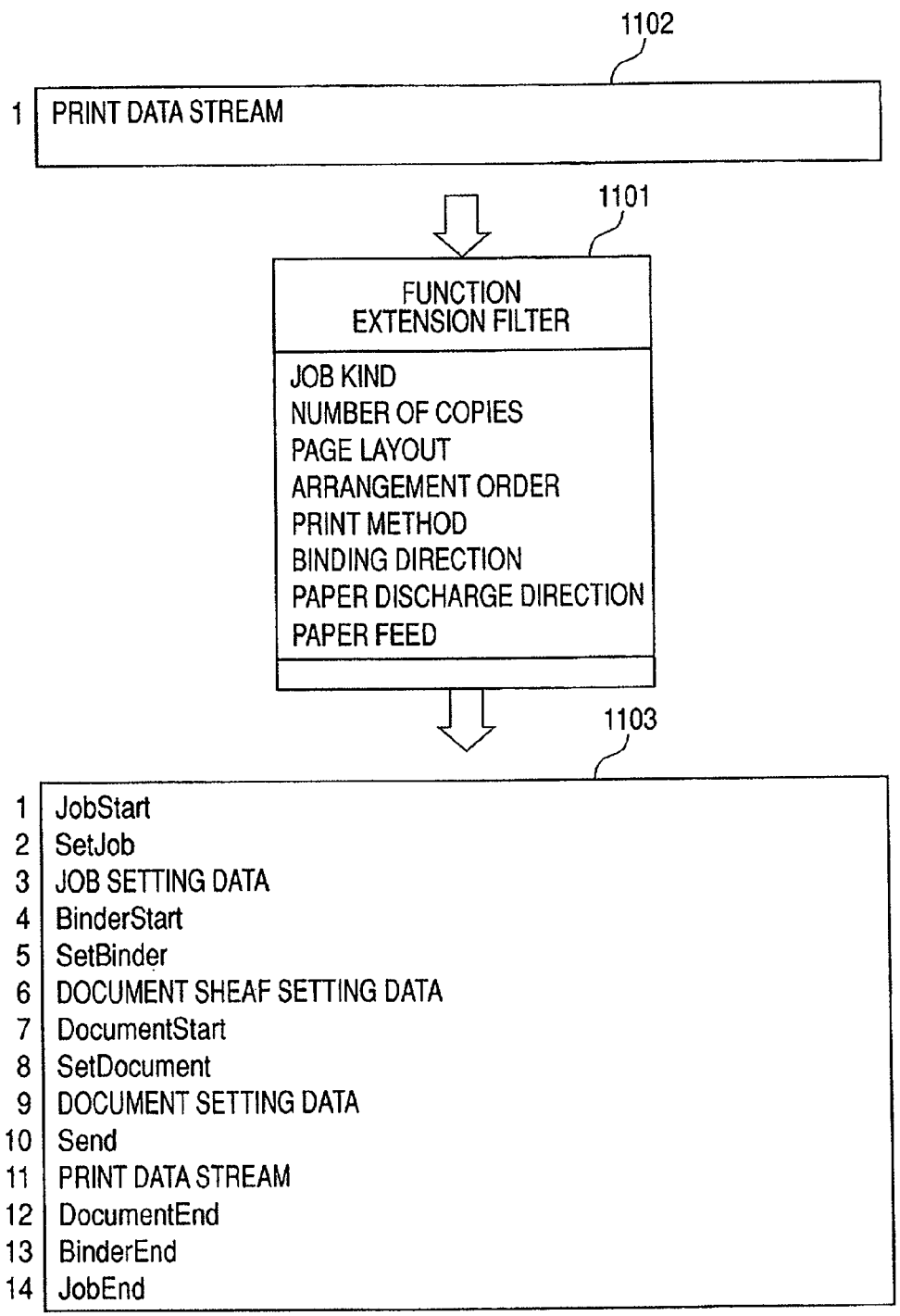
FIG. 11 is a diagram for explaining the process to be executed by the filter in the third embodiment.

FIG. 11 is a diagram for explaining the process to be executed by the filter in the third embodiment.

In FIG. 11, numeral 1101 denotes a function extension filter class object which reads the input stream, executes processes such as data conversion, data addition and the like to add a new function according to the read data, and then writes the processed data into the output stream. Here, as an example of the function extension, it will be explained that, in a case where a customer's system includes a dedicated PDL driver and this PDL driver does not correspond to new capabilities such as double-sided printing, various finishing and the like of a new printer, the new function of the image processing apparatus is activated by filtering correspondence on the printer side without changing the dedicated PDL driver.

The function extension filter 1101 has, as its attribute, print job setting for activating the new capability of the printer in which the above filter operates. The attribute value of the filter object is stored also in the nonvolatile memory of the image processing apparatus, whereby the status of the object is maintained even when the power supply of the image processing apparatus is once turned off and then turned on again.

Here, a job kind attribute has the values such as "print", "secure print" and the like. That is, the job kind attribute indicates the type of each of various jobs included in the printer. A number-of-copy attribute indicates how many sets of copies of printed materials should be produced. A page layout attribute indicates page layout designation. That is, the designation for applying plural pages to one paper (copy), such as "1 page/copy", "2 pages/copy", "4 pages/copy", etc., can be indicated by this attribute. Besides, the designation for enlarging one page and then divisionally printing the enlarged page on plural papers, such as "poster (2×2)", "poster (3×3)", etc., can be indicated by this attribute. An arrangement order attribute has the values such as "rightward from upper left", "downward from upper left", "leftward from upper right", "downward from upper right" and the like. That is, the arrangement order attribute indicates the designation of arrangement on each face in the page layout process. A print method attribute has the values such as "single-sided print", "double-sided print", "bookbinding print" and the like. That is, the print method attribute indicates the designation of print method. A binding direction attribute has the values such as "long edge binding (left)", "long edge binding (right)", "short edge binding (upper)", "short edge binding (lower)" and the like. That is, the binding direction attribute indicates the direction in which plural papers are bound in the finishing process. A paper discharge method attribute has the values such as "no designation", "sort", "staple", "punch hole" and the like. That is, the paper discharge method attribute indicates the finishing method. A paper feed attribute has the values such as "auto", "manual tray", "cassette", "deck", "plain paper", "board", "colored paper", "OHP" and the like. That is, the paper feed attribute indicates the designation of feeding of paper (transfer paper) to which image formation is executed.

Numeral 1102 denotes an example of the input data stream to the function extension filter 1101. More specifically, the input data stream 1102 is the print data stream which consists of PDL and text based on mere image formation description for each page generated by conventional application and printer driver.

Numeral 1103 denotes an example of the output data stream to be sequentially processed and output by the function extension filter 1101. In addition to the simple print data stream existing in the input data, various print job description data for making full use of the new functions of the printer are inserted in the output data stream 1103. Here, it should be noted that the print job description can express a nested construction, whereby it is possible to designate various attributes such as the attributes of the function extension filter 1101 with respect to the respective hierarchies of job unit, process unit such as finishing of binding plural documents, and individual document unit.

In the output data stream 1103, the first line shows the data indicating a start of job, the second line shows the data indicating a start of setting in unit of job, and the third line shows that the various set data in unit of job exist at this location. Further, the fourth line shows the data indicating a start of unit of lumping plural documents, the fifth line shows the data indicating a start of setting for the unit of lumping plural documents, and the sixth line shows that the set data for the unit of lumping plural documents exists at this location. Moreover, the seventh line shows the data indicating a start of document, the eighth line shows the data indicating a start of setting in unit of document, and ninth line shows that the set data in unit of document exists at this location. Furthermore, the tenth line shows the data indicating a start of document description data, and the eleventh line shows that the document description data expressing a document itself exists at this location. In this case, the print data stream existing in the input data stream 1102 exists at this location. Moreover, the twelfth line shows the data indicating an end of the document, the thirteenth line shows the data indicating an end of the unit of lumping plural documents, and the fourteenth line shows the data indicating an end of the job.

Figure 12:
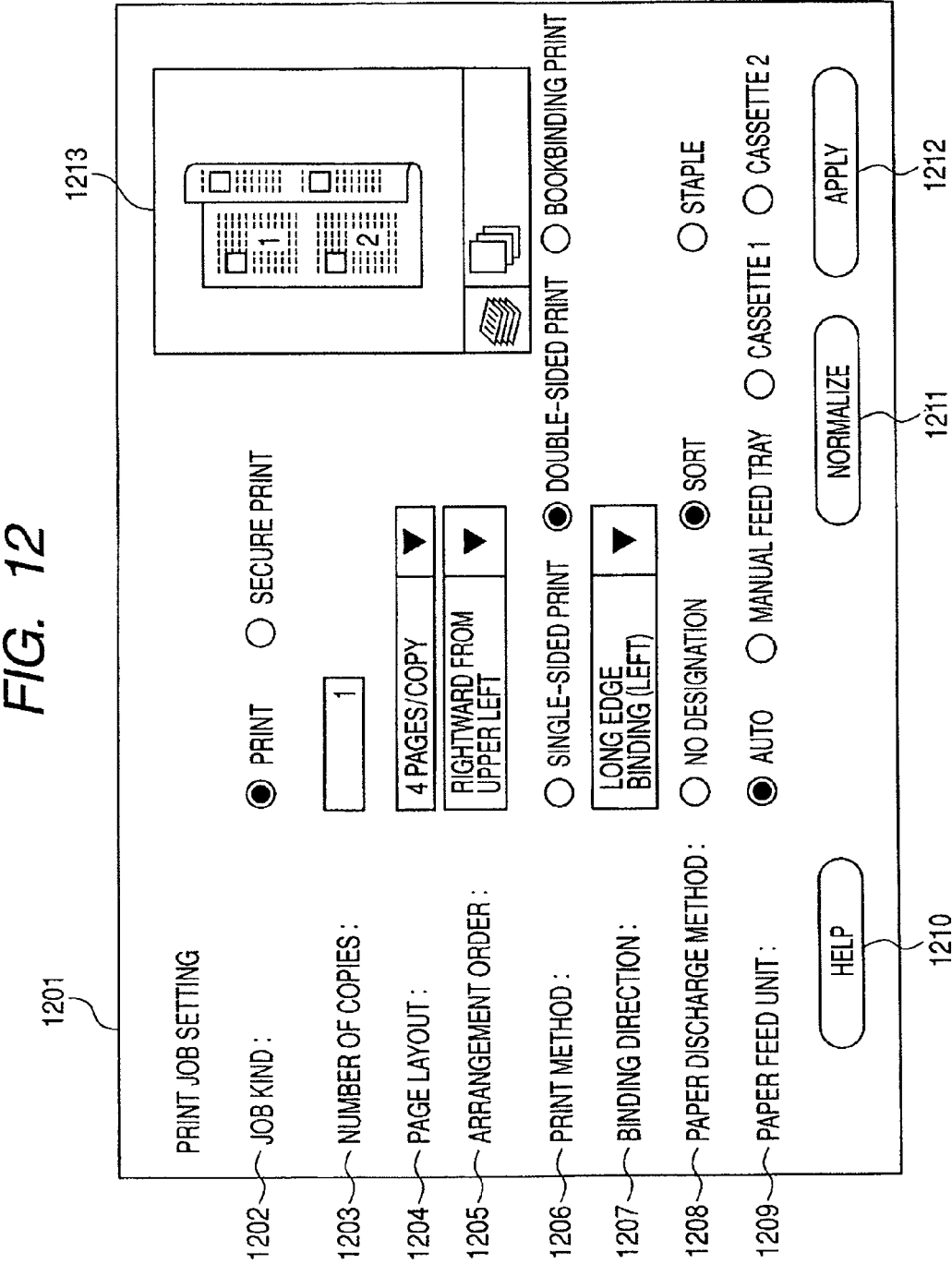
FIG. 12 is a diagram showing an example of the user interface to be used to operate the function extension filter.

FIG. 12 is a diagram showing an example of the user interface to be used to operate the function extension filter 1101.

The user interface to be used to operate the filter is implemented as the Web application (servlet) by the standard library and the HTTP service included in the framework 217 (FIG. 2), and is operated from the Web browser on the client side. Incidentally, it is also possible to constitute the user interface so as to be implemented as the applet service and operated from the operation panel 18 of the image processing apparatus.

In FIG. 12, numeral 1201 denotes a basic operation screen of the function extension filter 1101. On the basic operation screen 1201, it is possible to confirm and change the filter object attribute.

At a location 1202, the job kind attribute is handled.

At a location 1203, the number-of-copy attribute is handled.

At a location 1204, the page layout attribute is handled.

At a location 1205, the arrangement order attribute is handled.

At a location 1206, the print method attribute is handled.

At a location 1207, the binding direction attribute is handled.

At a location 1208, the paper discharge method attribute is handled.

At a location 1209, the paper feed attribute is handled.

Numeral 1210 denotes a help button. When the help button 1210 is depressed, the explanations concerning how to use the function extension filter 1101, the meaning of functions, the meaning of attributes, and the like are displayed.

Numeral 1211 denotes a normalize button. When the normalize button 1211 is depressed, the various attributes are respectively returned to their default values.

Numeral 1212 denotes an apply button. When the apply button 1212 is depressed, an attribute value change operation is applied, whereby a new value is actually set to the attribute of the filter object.

Numeral 1213 denotes a preview icon which shows a schematic diagram corresponding to the value of one of the several important attributes so as to give assistance for the user to confirm the various attributes.

As above, according to the third embodiment, in the filter which is flexibly extensible on the Java™ environment, the data necessary to activate the new function is added. Thus, even in the case where the filter is combined with the system, the application and the printer driver on the customer's environment which does not correspond to the new function of the printer, it is possible to make full use of the relevant new function.

Moreover, the Java™ environment prepares the means for implementing the user interface for the filter operating thereon as the software platform of further one layer in the firmware. Thus, the user interface for setting of the additional function can be provided on the filter.

Furthermore, the filter productivity is high, and the maintenance such as filter installment or the like is easy. Thus, there is a possibility that function extension individually corresponding to the customer can be provided according to the type of customer's use.

Other Embodiments

Incidentally, it is possible to constitute the function extension filter which, in a case where appearance of a certain character string pattern is found in the print-target character data string and the found pattern is in conformation to the specific character string pattern, generates the control data corresponding to the relevant character string instead of the control data included in the print data stream, and replaces or inserts the generated control data. In this case, for example, it is assumed that the customer or user inputs the specific character string as a mere text in an ordinary application such as s word processor or the like, and prints the input character string through an ordinary printer driver. Only by such an operation, it is possible in the filter on the printer side to convert the specific character string into an instruction string such as a vector drawing instruction or the like for drawing the image (e.g., logo, mark, watermark, etc.) corresponding to the specific character string.

Moreover, in the above embodiments, the Java™ virtual machine and environment are used as the interpreter environment 215 inside the firmware. However, the present invention is not limited to this. That is, even in a case where an interpreter environment such as another script language or the like is embedded in the firmware, it is possible to achieve the same effects such as the dynamic filter addition, the separation of the firmware portion, and the like. Moreover, the interpreter does not need to always interpret and execute one sequentially by one the instruction string composed of instruction sets for the interpreter. That is, at execution, the interpreter may convert in a lump a part or all of the instruction string into an instruction string of native instructions (that is, instruction set of hardware CPU) and execute in a lump the converted instruction string.

Besides, there are many other interpreter environments which enable to achieve high-efficiency development such as object oriented or the like, whereby it is also possible by using these interpreter environments to achieve the same effects such as the filter productivity and the like. In particular, also options such as "sed", "AWK", "Perl" and the like are suitable with respect to the process of the data stream based on the pattern matching.

Here, the object of the present invention can be attained even in a case where a storage medium which stores therein program codes of software to realize the functions of the above embodiments is supplied to a system or an apparatus, and thus a computer (or CPU or MPU) in the system or the apparatus reads and executes the program codes stored in the storage medium.

In this case, the program codes themselves read out of the storage medium realize the novel function of the present embodiment, whereby the storage medium which stores the relevant program codes and the program constitute the present invention.

As the storage medium for supplying the program codes, for example, a flexible disk, a hard disk, an optical disk, a magnetooptical disk, a CD-ROM, a CD-R, a CD-RW, a DVD-ROM, a DVD-RAM, a DVD-RW, a DVD+RW, a magnetic tape, a nonvolatile memory card, a ROM or the like can be used.

Moreover, the present invention includes not only a case where the functions of the above embodiments are realized by executing the program codes read by the computer, but also a case where an OS (operating system) or the like running on the computer executes a part or all of the actual processes on the basis of the indications of the program codes and thus the functions of the above embodiments are realized by these processes.

Furthermore, the present invention also includes a case where, after the program codes read out of the storage medium are written into a function extension card inserted in the computer or a memory in a function extension unit connected to the computer, a CPU or the like provided in the function extension card or the function extension unit executes a part or all of the actual processes on the basis of the indications of the program codes, and thus the functions of the above embodiments are realized by these processes.

The scope of the invention is, therefore, to be determined solely by the following claims and not limited by the text of the specifications and alternations made within a scope equivalent to the scope of the claims fall within the true spirit and scope of the invention.

This application claims priority from Japanese Patent Application No. 2004-093215 filed Mar. 26, 2004, which is hereby incorporated by reference herein.

The invention claimed is:

1. An image forming apparatus in which a filter program can be loaded, the filter program providing a filter processing which replaces specific data in a print data stream, the apparatus comprising:
a receiving unit configured to receive a print data stream from a printer driver, which is installed in a host computer via a network;
a printing unit configured to print an image based on the print data stream; and
a memory unit configured to store (i) an operating system, (ii) a print request reception program for operating the receiving unit, (iii) a job control program for operating the printing unit, (iv) a virtual machine which provides an execution environment to execute the filter program and a filter framework, runs on the operating system, and interprets the filter program and the filter framework, and (v) the filter framework,
wherein the filter framework provides a Web page, to be displayed on a Web browser installed in the host computer, to the Web browser, and the Web page is a screen for instructing to change the filter program to an activated status or an inactivated status,
wherein the filter framework changes the filter program to the activated status when an instruction for changing the filter program to the activated status is received from the Web browser, and changes the filter program to the inactivated status when an instruction for changing the filter program to the inactivated status is received from the Web browser,
wherein the filter framework controls the print request reception program to output the print data stream to the filter program in a case where the filter program is in the activated status,
wherein the filter framework controls the filter program to output, to the job control program, filter-processed data stream with which the specific data is replaced by the filter program in a case where the filter program is in the activated status, and
wherein the filter framework controls the print request reception program to output to the job control program in a case where the filter program is in the inactivated status.

2. The image forming apparatus according to claim 1, wherein the filter program-detects specific data which conforms to a predetermined data pattern in the print request data stream, generates a predetermined partial data stream, and replaces the specific data with the generated predetermined partial data stream.

3. The image forming apparatus according to claim 1, wherein the filter framework controls one or more filter programs to be able to be arranged in a data path of the print request data stream, and causes the arranged one or more filter programs to sequentially process the print request data stream.

4. The image forming apparatus according to claim 1, wherein the filter program can be installed or uninstalled based on an operation by a user.

5. The image forming apparatus according to claim 1, wherein the execution environment of the virtual machine is described in an interpreter language.

6. An image forming apparatus according to claim 1, wherein the filter framework displays a screen for causing a user to set whether to put the filter program into the activated status.

7. An image forming apparatus according to claim 6, wherein the screen is displayed in response to an instruction from a client computer.

8. An image forming apparatus according to claim 1, wherein the filter program inserts a control command indicating a new function of the printing unit.

9. A control method for an image forming apparatus in which a filter program can be loaded, the filter program providing a filter processing which replaces specific data in a print data stream, the method comprising:
receiving a print data stream from a printer driver, which is installed in a host computer, via a network;
printing an image based on the print data stream; and
storing in a memory (i) an operating system, (ii) a print request reception program for operating the receiving unit, (iii) a job control program for operating the printing unit, (iv) a virtual machine which provides an execution environment to execute the filter program and a filter framework, runs on the operating system, and interprets the filter program and the filter framework, and (v) the filter framework,
wherein the filter framework provides a Web page, to be displayed on a Web browser installed in the host computer, to the Web browser, and the Web page is a screen for instructing to change the filter program to an activated status or an inactivated status,
wherein the filter framework changes the filter program to the activated status when an instruction for changing the filter program to the activated status is received from the Web browser, and changes the filter program to the inactivated status when an instruction for changing the filter program to the inactivated status is received from the Web browser,
wherein the filter framework controls the print request reception program to output the print data stream to the filter program in a case where the filter program is in the activated status, wherein the filter framework controls the filter program to output, to the job control program, filter-processed data stream with which the specific data is replaced by the filter program in a case where the filter program is in the activated status, and wherein the filter framework controls the print request reception program to output to the job control program in a case where the filter program is in the inactivated status.

10. A control method according to claim 9, wherein the filter framework controls one or more filter programs to be able to be arranged in a data path of the print request data stream, and causes the arranged one or more filter programs to sequentially process the print request data stream.

11. A non-transitory computer-readable storage medium storing a computer-executable program for causing a computer to execute an image forming control method to be applied to an image forming apparatus in which a filter program can be loaded, the filter program providing a filter processing which replaces specific data in a print data stream, the image forming control method comprising:

receiving a print data stream from a printer driver, which is installed in a host computer, via a network;

printing an image based on the print data stream; and storing in a memory (i) an operating system, (ii) a print request reception program for operating the receiving unit, (iii) a job control program for operating the printing unit, (iv) a virtual machine which provides an execution environment to execute the filter program and a filter framework, runs on the operating system, and interprets the filter program and the filter framework, and (v) the filter framework, wherein the filter framework provides a Web page, to be displayed on a Web browser installed in the host computer, to the Web browser, and the Web page is a screen for instructing to change the filter program to an activated status or an inactivated status, wherein the filter framework changes the filter program to the activated status when an instruction for changing the filter program to the activated status is received from the Web browser, and changes the filter program to the inactivated status when an instruction for changing the filter program to the inactivated status is received from the Web browser, wherein the filter framework controls the print request reception program to output the print data stream to the filter program in a case where the filter program is in the activated status, wherein the filter framework controls the filter program to output, to the job control program, filter-processed data stream with which the specific data is replaced by the filter program in a case where the filter program is in the activated status, and wherein the filter framework controls the print request reception program to output to the job control program in a case where the filter program is in the inactivated status.

* * * * *